(12) United States Patent     (10) Patent No.:   US 12,675,953 B2

Yang                  (45) Date of Patent:     Jul. 7, 2026

---

(54) METHOD AND APPARATUS OF HAIR PROCESSING FOR VIRTUAL OBJECT, DEVICE, STORAGE MEDIUM, AND PROGRAM PRODUCT

(71) Applicant: Tencent Technology (Shenzhen) Company Limited, Shenzhen (CN)

(72) Inventor: Fan Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 18/792,396

(22) Filed: Aug. 1, 2024

(65) Prior Publication Data

US 2024/0394979 A1     Nov. 28, 2024

Related U.S. Application Data

(63) Continuation of application No. PCT/CN2023/126307, filed on Oct. 24, 2023.

(30) Foreign Application Priority Data

Dec. 7, 2022    (CN) ......................... 202211562688.3

(51) Int. Cl.
    *G06T 17/20*       (2006.01)
    *G06T 13/40*       (2011.01)
(52) U.S. Cl.
    CPC .............. *G06T 17/20* (2013.01); *G06T 13/40* (2013.01)
(58) Field of Classification Search
    CPC ......... G06T 17/20; G06T 13/40; G06T 17/00; G06T 3/00; G06T 3/40; G06T 7/70; G06F 30/25; G06V 10/80
    See application file for complete search history.

(56) References Cited

U.S. PATENT DOCUMENTS

| | | | |
|---|---|---|---|
| 5,777,619 A | 7/1998 | Brinsmead | |
| 2010/0277475 A1* | 11/2010 | McAdams | .............. G06T 19/00 |
| | | | 345/420 |
| 2018/0268591 A1* | 9/2018 | Zhou | ....................... G06F 30/20 |

FOREIGN PATENT DOCUMENTS

| | | |
|---|---|---|
| CN | 103870628 A | 6/2014 |
| CN | 105574913 A | 5/2016 |

(Continued)

OTHER PUBLICATIONS

Basori et. al., "Real Time Physical Force Driven Hair Animation", IJCSNS International Journal of Computer Science and Network Security, vol. 18 No. 10, Oct. 2018, (Year: 2018).*

(Continued)

*Primary Examiner* — Maurice L. McDowell, Jr.

(74) *Attorney, Agent, or Firm* — Morgan, Lewis & Bockius LLP

(57) ABSTRACT

This application provides a method of processing hair for a virtual object performed by an electronic device. The method includes: obtaining an initial position of each of hair particles of virtual hair of a virtual object; obtaining a physically simulated position of the hair particle by performing physical simulation on a movement of the hair particle in a physical movement based on the initial position of the hair particle; fusing the initial position and the physically simulated position of the hair particle, to obtain a fused position of the hair particle; and rendering the virtual hair of the virtual object based on the fused positions of the hair particles, to obtain rendered virtual hair.

20 Claims, 15 Drawing Sheets

(1) Hair mesh model     (2) Hair skeleton     (3) Hair particle model

(56) References Cited

FOREIGN PATENT DOCUMENTS

| CN | 109716338 | A | * | 5/2019 | ............. | G06F 30/17 |
|----|-----------|---|---|--------|-------------|-------------|
| CN | 114241100 | A |   | 3/2022 |             |             |
| CN | 114782605 | A |   | 7/2022 |             |             |
| CN | 115359151 | A | * | 11/2022 | ............ | G06T 11/40 |
| CN | 115641375 | A |   | 1/2023 |             |             |
| JP | 2009020874 | A |   | 1/2009 |            |             |

OTHER PUBLICATIONS

Chai et. al., "Adaptive Skinning for Interactive Hair-Solid Simulation", IEEE Transactions on Visualization and Computer Graphics, vol. 23, No. 7, Jul. 2017, (Year: 2017).*

Lyu et. al., "Real-Time Hair Simulation with Neural Interpolation", IEEE Transactions on Visualization and Computer Graphics 28.4 (2020): 1894-1905, (Year: 2020).*

Muller et. al., "Fast Simulation of Inextensible Hair and Fur", Workshop on Virtual Reality Interaction and Physical Simulation VRIPHYS (2012), (Year: 2012).*

Tencent Technology, ISR, PCT/CN2023/126307, Jan. 20, 2024, 3 pgs.

* cited by examiner (1) Hair mesh model     (2) Hair skeleton     (3) Hair particle model 1. Import a hair mesh model and a hair skeleton 2. Align the hair mesh model with a hair asset 3. Determine a skeletal joint corresponding to each hair particle and a corresponding rigging weight 4. Obtain a skinning matrix of each skeletal joint through an interface of a UE5

5. Obtain an animation position corresponding to the hair particle by using an animation skinning formula 6. Fuse the animation position and a physically simulated position, to obtain a fused position

FIG. 11

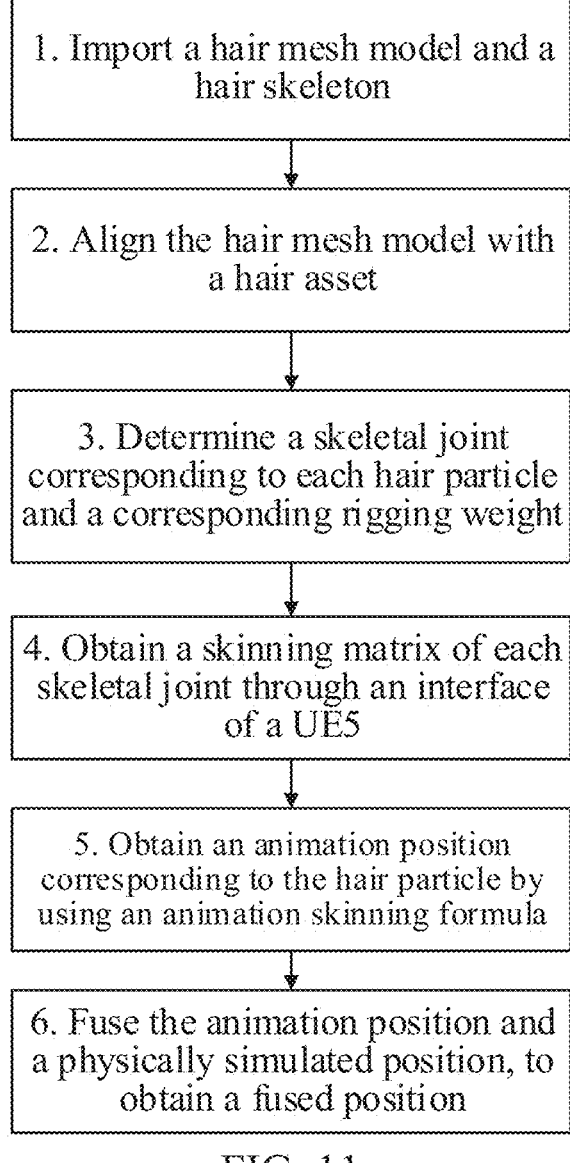

Dispatch(Strands Number, 0, 0), each box is a thread group

X(dim 0)

SV_GroupID

Y(dim 1) | 0, 0, 0 | 1, 0, 0 | 2, 0, 0 | 3, 0, 0 | 4, 0, 0 | ...... | Strands Number, 0, 0

For SV_GroupID(2, 0, 0), each small box is a thread

| 0, 0, 0 | 1, 0, 0 | 2, 0, 0 | 3, 0, 0 | 4, 0, 0 | ...... | 30, 0, 0 | 31, 0, 0 |

SV_GroupThreadID

FIG. 12

| | Hair style 1 | Hair style 2 | Hair style 3 (bundle) |
|---|---|---|---|
| Number of simulated virtual hair strands | 18 | 69 | 3 |
| Number of simulated hair particles | 862 | 1567 | 75 |
| Time consumption of fusion processing | Simulation of the hair styles 1 and 2 simultaneously for 0.046 ms | | 0.036 ms |

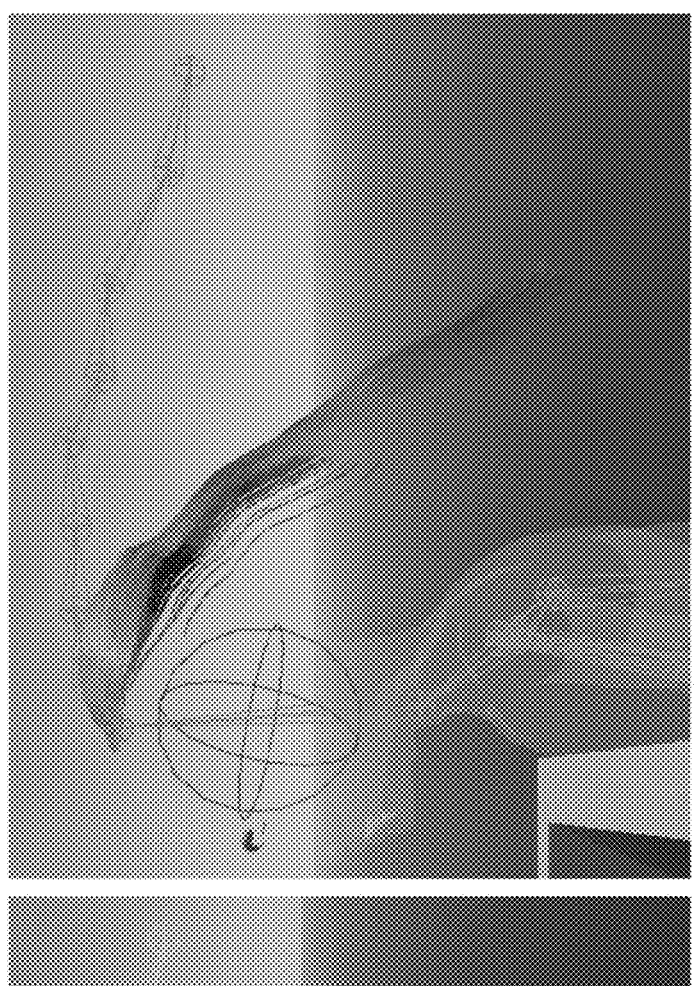
Skeletal animation fusion+spherical interpolation: an effect is correct, and a hair length is unchanged
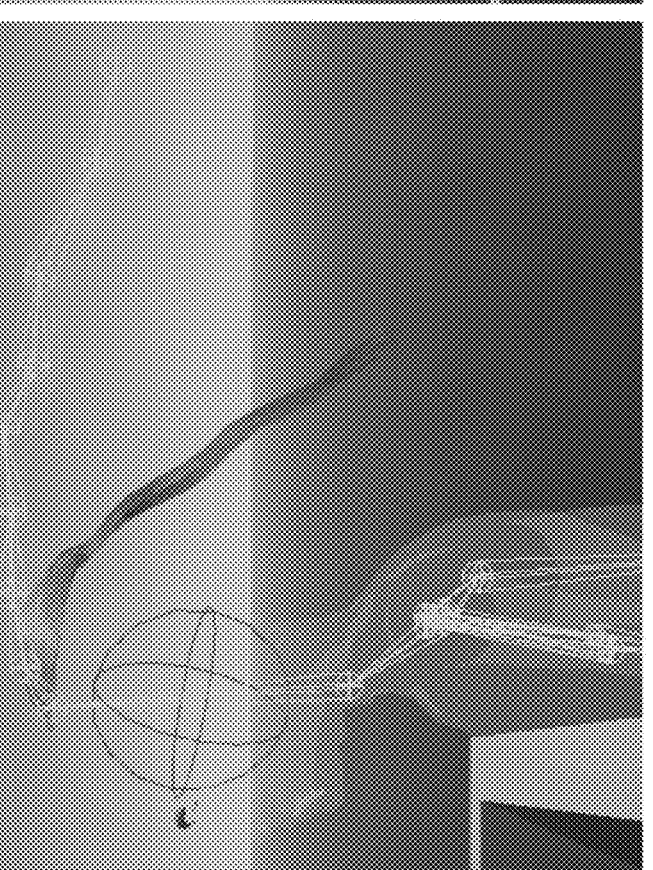
Skeletal animation fusion+linear interpolation: an effect is incorrect, and hair is shortened
FIG. 14D

METHOD AND APPARATUS OF HAIR PROCESSING FOR VIRTUAL OBJECT, DEVICE, STORAGE MEDIUM, AND PROGRAM PRODUCT

CROSS-REFERENCE TO RELATED APPLICATIONS

This application is a continuation application of PCT Patent Application No. PCT/CN2023/126307, entitled "METHOD AND APPARATUS OF HAIR PROCESSING FOR VIRTUAL OBJECT, DEVICE, STORAGE MEDIUM, AND PROGRAM PRODUCT" filed on Oct. 24, 2023, which is proposed based on and claims priority to Chinese Patent Application No. 202211562688.3, entitled "METHOD AND APPARATUS OF HAIR PROCESSING FOR VIRTUAL OBJECT, DEVICE, STORAGE MEDIUM, AND PROGRAM PRODUCT" filed on Dec. 7, 2022, both of which are incorporated by reference in their entirety.

FIELD OF THE TECHNOLOGY

This application relates to the field of computer technologies, and in particular, to a method and an apparatus of hair processing for a virtual object, an electronic device, a computer-readable storage medium, and a computer program product.

BACKGROUND OF THE DISCLOSURE

In the related art, virtual hair of a virtual object may be rendered by rendering a specific hair form produced by an artist, or by rendering a physical simulation result obtained by performing physical simulation on an initial hair form. However, it is difficult to achieve a real dynamic sense by rendering the specific hair form, and a specific style requirement may not be satisfied by rendering the physical simulation result, resulting in a poor display effect of rendered virtual hair.

SUMMARY

Embodiments of this application provide a method and an apparatus of hair processing for a virtual object, an electronic device, a computer-readable storage medium, and a computer program product, so that a display effect of rendered virtual hair can be improved.

Technical solutions of the embodiments of this application are implemented as follows:

An embodiment of this application provides a method of processing hair for a virtual object performed by an electronic device, the method including:

obtaining an initial position of each of hair particles of virtual hair of a virtual object;

obtaining a physically simulated position of the hair particle by performing physical simulation on a movement of the hair particle in a physical movement based on the initial position of the hair particle;

fusing the initial position and the physically simulated position of the hair particle, to obtain a fused position of the hair particle; and rendering the virtual hair of the virtual object based on the fused positions of the hair particles, to obtain rendered virtual hair.

An embodiment of this application further provides an electronic device, including:

a processor;

a memory; and a plurality of computer-executable instructions stored in the memory, wherein the computer-executable instructions, when executed by the processor, cause the electronic device to implement the method of hair processing for a virtual object provided in the embodiments of this application.

An embodiment of this application further provides a non-transitory computer-readable storage medium, having a plurality of computer-executable instructions stored therein. The computer-executable instructions, when executed by a processor of an electronic device, cause the electronic device to implement the method of processing hair for a virtual object provided in the embodiments of this application.

The embodiments of this application have the following beneficial effects:

First, the initial position of each of the hair particles in the virtual hair of the virtual object is obtained, and the physically simulated position of each of the hair particles is obtained. Then, for each of the hair particles, the initial position and the physically simulated position of the hair particle are fused, to obtain the fused position of the hair particle, so that the virtual hair is rendered based on the fused position of each of the hair particles, to obtain the rendered virtual hair. The initial position of the hair particle can support the virtual hair in a specific hair form. The physically simulated position is obtained by performing physical simulation on the position of the hair particle during the real physical movement based on the initial position of the hair particle, so that a real dynamic sense of the virtual hair can be increased. In this way, the virtual hair is rendered based on the fused position (fusion between the initial position and the physically simulated position), so that hardware processing resources of a device are fully utilized, and combination of the real dynamic sense of the physical simulation and a specific style can be implemented. In this way, the rendered virtual hair satisfies a requirement of the specific style of the virtual hair and has the real dynamic sense, thereby improving the display effect of the rendered virtual hair.

BRIEF DESCRIPTION OF THE DRAWINGS

FIG. 11 is a schematic flowchart 3 of a method of hair processing for a virtual object according to an embodiment of this application.

FIG. 12 is a schematic diagram of performing parallel processing on virtual hair according to an embodiment of this application.

FIG. 14D is a schematic diagram 4 of virtual hair according to an embodiment of this application.

DESCRIPTION OF EMBODIMENTS

Figures 1, 2:
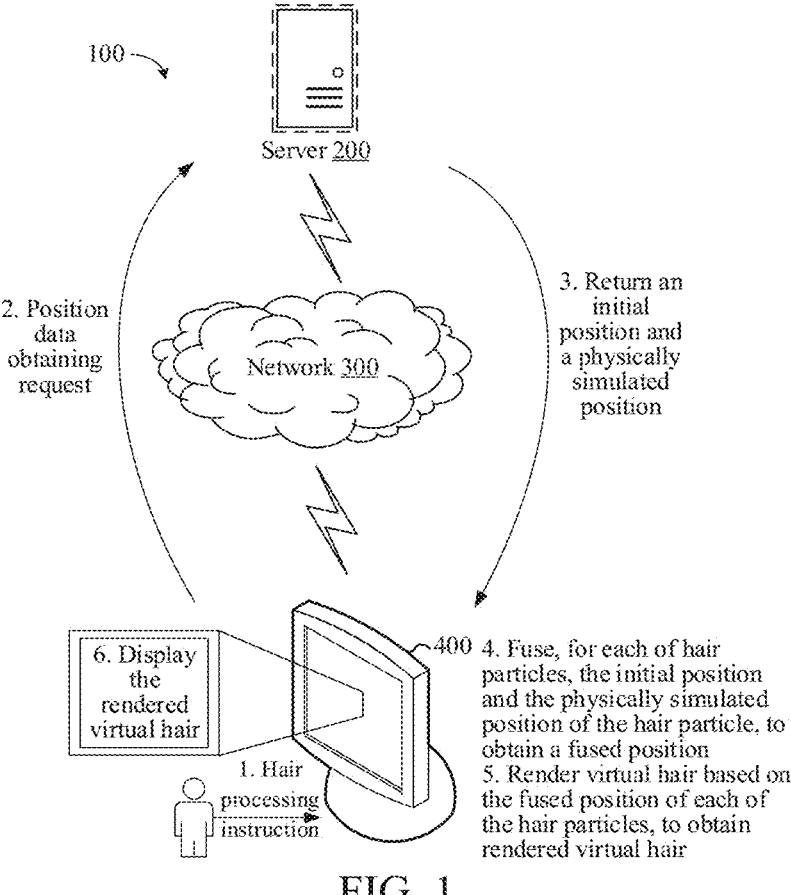
FIG. 1 is a schematic architectural diagram of a system 100 of hair processing for a virtual object according to an embodiment of this application.
FIG. 2 is a schematic structural diagram of an electronic device 500 implementing a method of hair processing for a virtual object according to an embodiment of this application.

To make the objectives, technical solutions, and advantages of this application clearer, the following describes this application in detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, the "some embodiments" may be the same subset or different subsets of all the possible embodiments, and may be combined with each other without conflict.

In the following description, the term "first/second/third" is merely intended to distinguish between similar objects and does not indicate a specific order of the objects. The "first/second/third" may be interchanged in a specific order or sequence if permitted, so that the embodiments of this application described herein can be implemented in an order other than those illustrated or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are described in detail, terms provided in the embodiments of this application are described. The terms provided in the embodiments of this application are applicable to the following explanations.

(1) In response to: It is configured for indicating a condition or a state on which a to-be-performed operation depends on. When the condition or the state on which the to-be-performed operation depends on is satisfied, one or more (or at least two) to-be-performed operations may be performed in real time, or may be performed after a set delay. Unless explicitly stated, there is no limitation on an order in which a plurality of to-be-performed operations.

(2) Virtual object: It is an image of each of various people and objects appearing in a virtual scene (such as a game, a cartoon, or a television play). The virtual object may be a virtual character, a virtual animal, a cartoon character, or the like, for example, a character, an animal, a plant, an oil drum, a wall, a stone, and the like displayed in the virtual scene.

(3) Hair particle: It is the smallest unit of virtual hair or a virtual hair strand of the virtual object. In actual application, a hair strand can be formed by connecting a hair particle at a hair root, a hair particle at a hair end, and a plurality of hair particles between the hair root and the hair end.

(4) Hair particle model: It is configured for indicating an initial hair particle position of the hair particle of the virtual object, that is, indicating a hair initial state of the hair particle.

(5) Skinned skeletal animation: It is also referred to as a skeletal animation, and is an animation implementation solution based on a skeletal animation and skinning weighted polygonal mesh, which can achieve an animation effect of limbs and clothes of the virtual object based on the skinned skeletal animation in a game.

Embodiments of this application provide a method and an apparatus of hair processing for a virtual object, an electronic device, a computer-readable storage medium, and a computer program product, so that a display effect of rendered virtual hair can be improved.

An implementation scenario of the method of hair processing for a virtual object provided in the embodiments of this application is described below. FIG. 1 is a schematic architectural diagram of a system 100 of hair processing for a virtual object according to an embodiment of this application. To support an exemplary application, a terminal 400 is connected to a server 200 by a network 300. The network 300 may be a wide area network or a local area network, or a combination thereof. Data transmission is implemented using a wireless or wired link.

The terminal 400 is configured to transmit a position data obtaining request to the server 200 in response to a hair processing instruction for a virtual object. The position data obtaining request is configured for obtaining an initial position and a physically simulated position of each of hair particles in virtual hair of the virtual object. The physically simulated position is obtained by performing physical simulation on a position of the hair particle in a physical movement based on the initial position of the hair particle.

The server 200 is configured to receive the position data obtaining request transmitted by the terminal 400; and return, in response to the position data obtaining request, the initial position and the physically simulated position of each of the hair particles in the virtual hair of the virtual object to the terminal 400.

The terminal 400 is further configured to receive the initial position and the physically simulated position of each of the hair particles in the virtual hair returned by the server 200; fuse, for each of the hair particles, the initial position and the physically simulated position of the hair particle, to obtain a fused position of the hair particle; render the virtual hair based on the fused position of each of the hair particles, to obtain rendered virtual hair; and display the rendered virtual hair.

In some embodiments, the method of hair processing for a virtual object provided in the embodiments of this application may be implemented by various electronic devices, for example, may be implemented by a terminal alone, or may be implemented by a server alone, or may be implemented by a terminal and a server in cooperation. For example, the terminal alone performs the method of hair processing for a virtual object provided in the embodiments of this application; or the terminal transmits a hair processing request for the virtual object to the server, and the server performs, according to the received hair processing request, the method of hair processing for a virtual object provided in the embodiments of this application. The embodiments of this application may be applied to various scenarios, including, but not limited to, a cloud technology, artificial intelligence, intelligent transportation, assisted driving, and the like.

In some embodiments, the electronic device implementing hair processing for a virtual object provided in the embodiments of this application may be various types of terminal devices or servers. The server (for example, the server 200) may be an independent physical server, or may be a server cluster formed by a plurality of physical servers or a distributed system. The terminal (for example, the terminal 400) may be a smartphone, a tablet computer, a notebook computer, a desktop computer, a smart voice interaction device (for example, a smart speaker), a smart home appliance (for example, a smart television), a smart-watch, an in-vehicle terminal, or the like, but is not limited thereto. The terminal and the server may be directly or indirectly connected in a wired or wireless communication manner. This is not limited in the embodiments of this application.

In some embodiments, the method of hair processing for a virtual object provided in the embodiments of this application may be implemented by using a cloud technology. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A background service of a technical network system requires a large amount of computing and storage resources. For example, the server (for example, the server 200) may further be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In some embodiments, the terminal or the server may implement, by running a computer program, the method of hair processing for a virtual object provided in the embodiments of this application. For example, the computer program may be a native program or a software module in an operating system, may be a native application (APP), namely, a program that needs to be installed in an operating system to run; may be an applet, namely, a program that only needs to be downloaded into a browser environment to run; or may be an applet that can be embedded into any APP. In summary, the computer program may be any form of an application, a module, or a plug-in.

In some embodiments, a plurality of servers may form a blockchain, and the server is a node on the blockchain. Information connections may exist between nodes on the blockchain, and information may be transmitted between the nodes through the information connections. Data (such as an initial position, a physically simulated position, and a fused position of each of hair particles in virtual hair, a hair particle model, a hair mesh model, and a hair skeleton) related to the method of hair processing for a virtual object provided in the embodiments of this application may be stored on the blockchain.

The electronic device implementing the method of hair processing for a virtual object provided in the embodiments of this application is described below. FIG. 2 is a schematic structural diagram of an electronic device 500 implementing a method of hair processing for a virtual object according to an embodiment of this application. An example in which the electronic device 500 is the terminal shown in FIG. 1 is used. The electronic device 500 implementing the method of hair processing for a virtual object provided in the embodiments of this application includes: at least one processor 510, a memory 550, at least one network interface 520, and a user interface 530. All components in the electronic device 500 are coupled together by using a bus system 540. The bus system 540 is configured to implement connection and communication between the components. In addition to a data bus, the bus system 540 further includes a power bus, a control bus, and a state signal bus. However, for ease of clear description, all types of buses in FIG. 2 are marked as the bus system 540.

The processor 510 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The memory 550 may be a removable memory, a non-removable memory, or a combination thereof. The memory 550 may include one or more storage devices that are physically away from the processor 510. The memory 550 includes a volatile memory or a non-volatile memory, or may include both the volatile memory and the non-volatile memory. The non-volatile memory may be a read-only memory (ROM), and the volatile memory may be a random access memory (RAM). The memory 550 described in this embodiment of this application is to include any suitable type of memories.

In some embodiments, the memory 550 may store data to support various operations. Examples of the data include a program, a module, and a data structure, or a subset or a superset thereof, which are described below by using examples.

An operating system 551 includes a system program configured to process various basic system services and execute hardware-related tasks, for example, a framework layer, a core library layer, a driver layer, and the like, and is configured to implement various basic services and process hardware-based tasks.

A network communication module 552 is configured to reach another electronic device through one or more (wired or wireless) network interfaces 520. Exemplary network interfaces 520 include: Bluetooth, wireless compatibility authentication (Wi-Fi), a universal serial bus (USB), and the like.

In some embodiments, an apparatus of hair processing for a virtual object provided in the embodiments of this application may be implemented in a software manner. FIG. 2 shows an apparatus 553 of hair processing for a virtual object stored in the memory 550. The hair processing apparatus 553 may be software in a form of a program, a plug-in, and the like, including the following software modules: an obtaining module 5531, a fusion module 5532, and a rendering module 5533. These modules are logical, and therefore may be combined or split according to imple-mented functions in different manners. Functions of the modules are described below.

Figure 3:
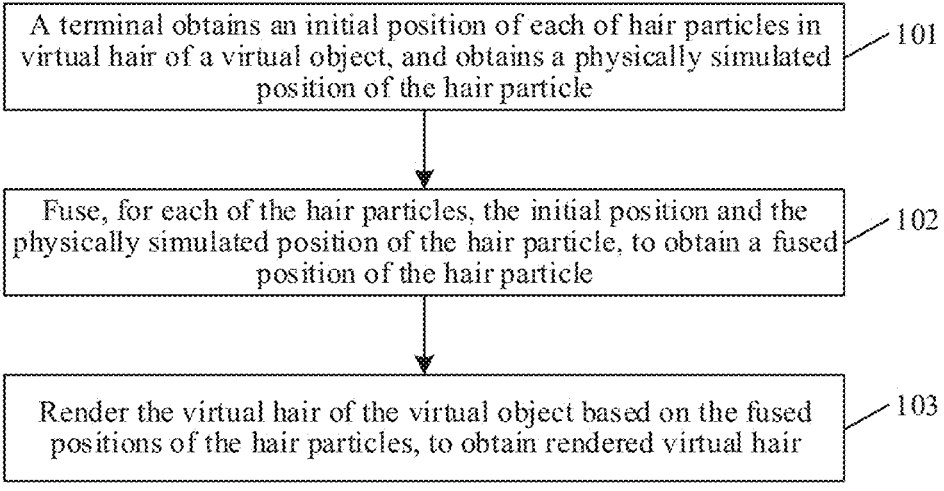
FIG. 3 is a schematic flowchart 1 of a method of hair processing for a virtual object according to an embodiment of this application.

The method of hair processing for a virtual object pro-vided in the embodiments of this application is described below. In some embodiments, the method of hair processing for a virtual object provided in the embodiments of this application may be implemented by various electronic devices, for example, may be implemented by a terminal alone, or may be implemented by a server alone, or may be implemented by a terminal and a server in cooperation. An example in which the terminal implements the method is used. FIG. 3 is a schematic flowchart 1 of a method of hair processing for a virtual object according to an embodiment of this application. The method of hair processing for a virtual object provided in this embodiment of this applica-tion includes the following operations.

Operation 101: Obtain an initial position of each of hair particles in virtual hair of a virtual object, and obtain a physically simulated position of the hair particle.

In actual application, when the virtual object is a virtual character, the virtual hair of the virtual object may be hair of the virtual character, and when the virtual object is a virtual animal, the virtual hair of the virtual object may be guard hair or coat or hair of the virtual animal. The virtual object may be an object in a virtual scene, and the virtual scene may be a game scene.

The physically simulated position is obtained by perform-ing physical simulation on a position of the hair particle in a physical movement based on the initial position of the hair particle.

In operation 101, an application or a client configured to process the hair of the virtual object (for example, generate a special effect of the hair of the virtual object in the virtual scene) may be arranged in the terminal. The client may be a client dedicated to generating the hair of the virtual object, namely, a hair generation client; or may be a client having a function of generating the hair of the virtual object, such as a video client, an education client, or a game client. The terminal implements processing on the hair of the virtual object by running a corresponding application. In this embodiment of this application, the initial position of the hair particle in the virtual hair may be determined as follows: 1. When a hair particle model of the virtual hair is in an initial form, a model position of each of the hair particles in the hair particle model may be used as the initial position, the hair particle model being produced (for example, by a designer) for the virtual hair of the virtual object. 2. An animation position corresponding to the hair particle in a skinned skeletal animation of the virtual hair may be used as the initial position.

In operation 101, the physically simulated position of the hair particle is obtained by performing physical simulation on the position of the hair particle during the real physical movement based on the initial position of the hair particle. To be specific, the physical simulation is performed on a movement state of the hair particle, to obtain a spatial position of the hair particle at each movement moment. The physically simulated position obtained in operation 101 is a spatial position of the hair particle at a movement moment during the real physical movement.

In some embodiments, the terminal may obtain the physi-cally simulated position of each of the hair particles in the following manner: separately performing the following pro-cessing for each of the hair particles: obtaining a boundary restriction parameter and a movement parameter of the hair particle, the boundary restriction parameter being a farthest position reachable by the hair particle during the movement, and the movement parameter including a movement speed and a movement direction of the hair particle; and adjusting the initial position of the hair particle based on the boundary restriction parameter and the movement parameter, to obtain the physically simulated position of the hair particle.

In actual application, when the physical simulation is performed on the hair particle, a physical simulation param-eter and a physical simulation rule of the hair particle may be first set. The physical simulation parameter may include the boundary restriction parameter and the movement parameter. (1) The boundary restriction parameter is the farthest position reachable by the hair particle during the movement. In other words, the boundary restriction param-eter is configured for restricting the hair particle from reaching any position within a space, but allowing the hair particle to move within a restricted region indicated by the boundary restriction parameter. (2) The movement param-eter may include the movement speed and the movement direction of the hair particle, may further include a move-ment acceleration of the hair particle, may be configured for controlling a force of the movement of the hair particle, and the like. The physical simulation rule may be a physical law, such as Newton's first law of mechanics (the law of inertia), or Newton's second law of mechanics (the law of accelera-tion of gravity).

Based on this, when the physical simulation is performed on the hair particle, the initial position of the hair particle may be adjusted based on the boundary restriction parameter and the movement parameter, to obtain the physically simu-lated position of the hair particle. In actual implementation, the physically simulated position of the hair particle in each frame of animation during the movement may be obtained by simulation. Starting from the initial position of the hair particle, the physically simulated position of the hair particle in each frame of animation is obtained in the following manner: calculating a target position of the hair particle in a first frame of animation based on the initial position and the movement speed of the hair particle, and updating the position of the hair particle from the initial position to the target position when the target position satisfies the bound-ary restriction parameter; and then calculating a new target position of the hair particle in a next frame of animation based on the target position in the first frame of animation and the movement speed of the hair particle, and updating the position of the hair particle from the target position to the new target position when the new target position satisfies the boundary restriction parameter. By analogy, the target posi-tion of the hair particle in each frame of animation is obtained, and the target position is the physically simulated position.

Through application of the foregoing embodiment, a real dynamic sense of the hair can be reproduced by performing physical simulation on the position of the hair particle of the virtual hair during the real physical movement, so that a real sense style of the virtual hair is strengthened.

Obtaining the initial position of each of the hair particles in the virtual hair is described below. In some embodiments, the terminal may obtain the initial position of each of the hair particles in the virtual hair of the virtual object in the following manner: obtaining a hair particle model created for the virtual hair of the virtual object, the hair particle model including the hair particles in the virtual hair; and determining, for each of the hair particles, a model position of the hair particle in the hair particle model as the initial position of the hair particle.

In actual application, the designer may create the corresponding hair particle model for the virtual hair of the virtual object. The hair particle model includes the hair particles in the virtual hair. In this way, the model position of the hair particle in the hair particle model in an initial state may be used as the initial position of the hair particle. The initial position of the hair particle can support the virtual hair in a specific hair form. Through application of the foregoing embodiment, the model position of the hair particle in the created hair particle model in the initial state can be fused with the physically simulated position, so that combination of a real sense of physical simulation and a specific art design style is implemented. In this way, a requirement of a specific style of the virtual hair can be satisfied, such as two ends of a hair strand of the virtual hair are fixed (that is, the two ends of the hair strand do not completely conform to an effect of the physical simulation), or an intermediate hair part of the virtual hair is fixed (that is, the intermediate hair part does not completely conform to an effect of the physical simulation).

In some embodiments, the terminal may alternatively obtain the initial position of each of the hair particles in the virtual hair of the virtual object in the following manner: obtaining a hair particle model, a hair mesh model, and a hair skeleton of the virtual hair of the virtual object, the hair particle model including the hair particles in the virtual hair, the hair mesh model including a plurality of mesh vertexes, and the hair skeleton including a plurality of skeletal joints; and each of the mesh vertexes being rigged with at least one related skeletal joint, to form a skinned skeletal animation of the virtual hair, and each of the skeletal joints having a corresponding rigging weight; determining, for each of the hair particles, a hair particle position of the hair particle in a model coordinate system of the hair mesh model, determining at least one target skeletal joint related to the hair particle from the plurality of skeletal joints, and determining a target rigging weight of each of the at least one target skeletal joint; and determining, for each of the hair particles, an animation position of the hair particle in the skinned skeletal animation based on the hair particle position and the target rigging weight of each of the at least one target skeletal joint, and using the animation position of the hair particle as the initial position of the hair particle.

In actual application, each skeletal joint has a rigging weight having a rigging relationship with the skeletal joint. The rigging weight may be preset by an artist or a designer. In this way, a dynamic effect of each segment of a virtual hair strand can be flexibly controlled.

Figure 4:
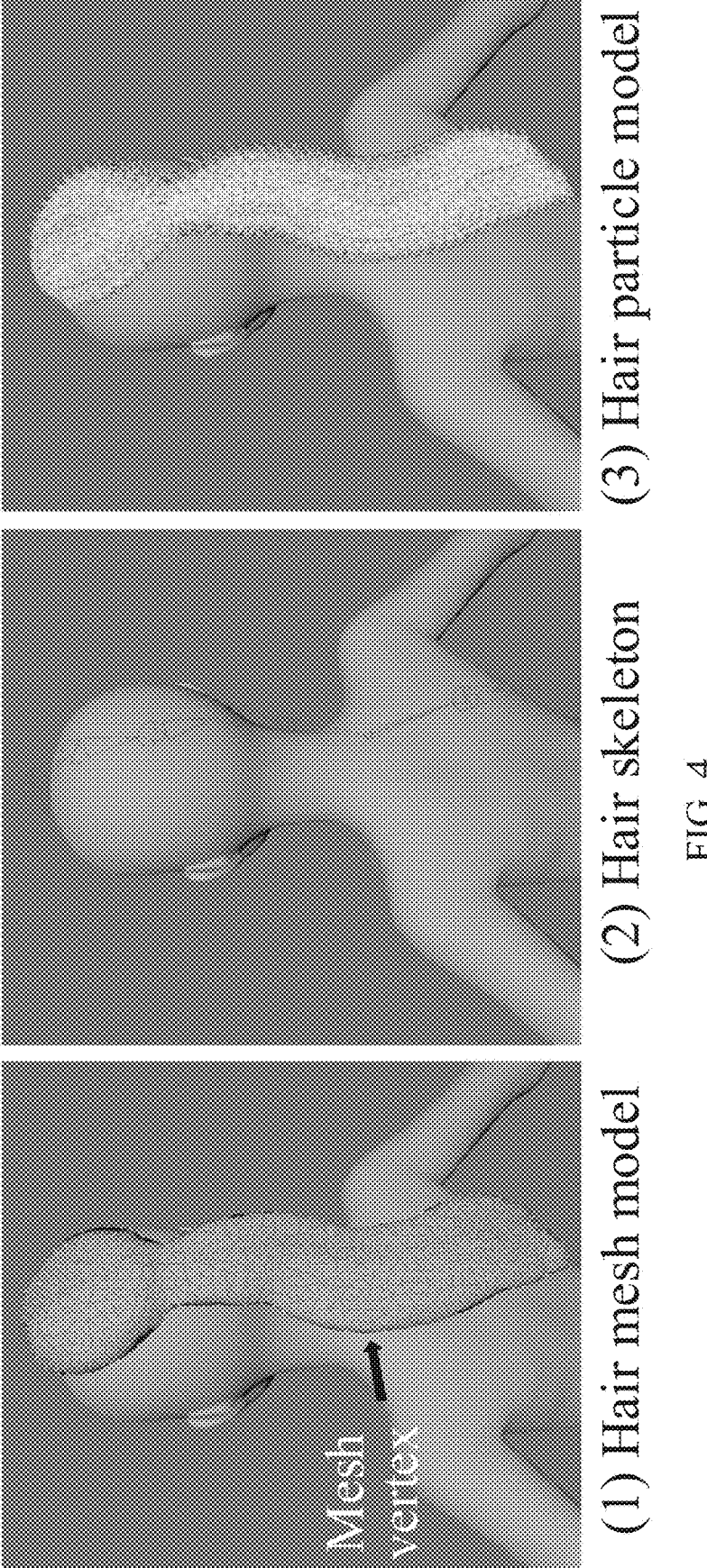
FIG. 4 is a schematic diagram of a hair particle model, a hair mesh model, and a hair skeleton according to an embodiment of this application.

In actual application, the animation position corresponding to the hair particle in the skinned skeletal animation of the virtual hair may be used as the initial position. FIG. 4 is a schematic diagram of a hair particle model, a hair mesh model, and a hair skeleton according to an embodiment of this application. (1) in FIG. 4 shows the hair mesh model (or a hair polygonal mesh model, including a plurality of mesh vertexes) of the virtual hair, (2) in FIG. 4 shows the hair skeleton (including a plurality of skeletal joints) of the virtual hair, and (3) in FIG. 4 shows the hair particle model (including a plurality of hair particles) of the virtual hair. In actual implementation, the skinned skeletal animation of the virtual hair is obtained by rigging the hair mesh model of the virtual hair and the hair skeleton. To be specific, the following processing is performed on each of the hair particles in the hair mesh model: determining, for the hair particle, at least one skeletal joint related to the hair particle from the hair skeleton; obtaining a rigging weight corresponding to each skeletal joint; and separately rigging the at least one skeletal joint with the hair particle based on the rigging weight corresponding to each skeletal joint. In this way, a skinned skeletal animation of the virtual hair in a rigged posture is obtained.

Then, the animation position of the hair particle in the skinned skeletal animation of the virtual hair can be determined, so that the animation position of the hair particle is used as the initial position of the hair particle. A manner of determining the animation position of the hair particle in the skinned skeletal animation is described below.

First, for each of the hair particles, the hair particle position of the hair particle in the model coordinate system of the hair mesh model is first obtained. In some embodiments, the terminal may determine the hair particle position of the hair particle in the model coordinate system of the hair mesh model in the following manner: moving the hair particle model, the moved hair particle model being aligned with the hair mesh model; obtaining coordinate transformation information generated during the movement and an initial hair particle position of each of the hair particles in the hair particle model; and determining the hair particle position of the hair particle in the model coordinate system of the hair mesh model based on the initial hair particle position and the coordinate transformation information.

In actual implementation, the hair particle model and the hair mesh model are first aligned. To be specific, the hair particle model is moved, so that the hair particle model is aligned with the hair mesh model. For example, in a game engine (for example, the Unreal Engine (UE) 5) scene, the hair particle model is moved, so that positions of the hair particle model and the hair mesh model coincide.

In actual implementation, a user may align the hair particle model with the hair mesh model by using an application supporting hair processing for a virtual object, such as a virtual engine. The user triggers a model import operation, to import the hair particle model and the hair mesh model into the application. Since shapes of the hair particle model and the hair mesh model are consistent during production, the user can manually drag or move the hair particle model, so that the hair particle model and the hair mesh model coincide, thereby aligning the hair particle model with the hair mesh model. In addition, during moving the hair particle model to align the hair particle model with the hair mesh model, the application also records displacement of the hair particle model generated during the movement. The coordinate transformation information, for example, a change of coordinate information during the movement, generated by the hair particle model during the movement is then determined according to the recorded displacement. The initial hair particle position of each of the hair particles in the hair particle model and the coordinate transformation information are added, to obtain the hair particle position of the hair particle in the model coordinate system of the hair mesh model.

Second, the at least one target skeletal joint related to the hair particle is determined from the plurality of skeletal joints, and the target rigging weight corresponding to each of the at least one target skeletal joint is determined. In some embodiments, the terminal may determine the at least one target skeletal joint related to the hair particle from the plurality of skeletal joints, and determine the target rigging weight of each of the at least one target skeletal joint in the following manner: determining a target mesh vertex closest to the hair particle from the plurality of mesh vertexes; and determining at least one skeletal joint related to the target mesh vertex as the at least one target skeletal joint related to the hair particle, and determining a rigging weight of each of the at least one skeletal joint related to the target mesh vertex as the target rigging weight corresponding to each of the at least one target skeletal joint.

In actual application, when the at least one target skeletal joint related to the hair particle and the target rigging weight of each of the at least one target skeletal joint are determined, the target mesh vertex closest to the hair particle may be determined from the plurality of mesh vertexes of the hair mesh model. In this way, the at least one skeletal joint related to the target mesh vertex is used as the at least one target skeletal joint related to the hair particle, and the rigging weight related to each of the at least one skeletal joint related to the target mesh vertex is used as the target rigging weight of each of the at least one target skeletal joint.

Third, for each of the hair particles, the animation position of the hair particle in the skinned skeletal animation is determined based on the hair particle position and the target rigging weight of each of the at least one target skeletal joint. In some embodiments, the terminal may determine the animation position of the hair particle in the skinned skeletal animation based on the hair particle position and the target rigging weight of each of the at least one target skeletal joint in the following manner: separately performing the following processing for each of the at least one target skeletal joint: multiplying the hair particle position and the target rigging weight of the target skeletal joint, to obtain an intermediate particle position of the hair particle relative to the target skeletal joint; obtaining a skinning matrix of the target skeletal joint, and multiplying the intermediate particle position and the skinning matrix, to obtain an intermediate animation position; and adding intermediate animation positions corresponding to the at least one target skeletal joint, to obtain the animation position of the hair particle in the skinned skeletal animation.

In actual implementation, when the animation position of the hair particle in the skinned skeletal animation is determined, the following processing is separately performed for each of the at least one target skeletal joint: first, multiplying the hair particle position and the target rigging weight of the target skeletal joint, to obtain the intermediate particle position of the hair particle relative to the target skeletal joint, the intermediate particle position being position coordinates of the hair particle in a skeletal coordinate system of the target skeletal joint; then, obtaining the skinning matrix of the target skeletal joint, and multiplying the intermediate particle position and the skinning matrix, to obtain the intermediate animation position; and finally, adding the intermediate animations position corresponding to the at least one target skeletal joint, to obtain the animation position of the hair particle in the skinned skeletal animation. In this way, with the help of the skinning matrix of the target skeletal joint, the position of the hair particle is transformed, that is, transformation of the position of the hair particle in two different coordinate systems (a mesh coordinate system corresponding to the hair mesh model and the skeletal coordinate system corresponding to the hair skeleton) is implemented, to obtain the animation position of the hair particle in the skinned skeletal animation.

In actual implementation, the skinning matrix is obtained by multiplying two transform matrices (including a first transform matrix and a second transform matrix). (1) The first transform matrix is configured for transforming, for the skinned skeletal animation in a rigged posture, position coordinates of the hair particle in the mesh coordinate system (corresponding to the hair mesh model) into position coordinates of the hair particle in the skeletal coordinate system (corresponding to the hair skeleton). The first transform matrix is fixed. (2) The second transform matrix is configured for transforming, for a frame posture of a current animation frame, the position coordinates of the hair particle in the skeletal coordinate system (corresponding to the hair skeleton) into the position coordinates of the hair particle in the mesh coordinate system (corresponding to the hair mesh model). Different animation frames have different second transform matrices.

Through application of the foregoing embodiment, the animation position corresponding to the hair particle in the skinned skeletal animation of the virtual hair can be fused with the physically simulated position, so that combination of the real sense of the physical simulation and the specific art design style in the animation is implemented. In this way, the requirement of the specific style of the virtual hair can be satisfied.

Operation 102: Fuse, for each of the hair particles, the initial position and the physically simulated position of the hair particle, to obtain a fused position of the hair particle.

After the initial position and the physically simulated position of each of the hair particles are obtained, in operation 102, for each of the hair particles, the initial position and the physically simulated position of the hair particle are fused, to obtain the fused position of the hair particle.

In actual application, corresponding weights may be respectively set for the initial position of the hair particle and the physically simulated position of the hair particle, to weight the initial position of the hair particle and the physically simulated position of the hair particle based on the weights of different positions, to obtain the fused position of the hair particle. In this way, through setting of the weights, the position of each of the hair particles in the hair strand of the virtual object can be flexibly controlled. In some embodiments, the terminal may fuse the initial position of the hair particle and the physically simulated position of the hair particle in the following manner: separately performing the following processing for each of the hair particles: obtaining a first weight of the initial position of the hair particle and a second weight of the physically simulated position of the hair particle; and weighting the initial position and the physically simulated position based on the first weight and the second weight, to obtain the fused position of the hair particle.

In some embodiments, the virtual hair includes a plurality of virtual hair strands, and the virtual hair strand includes at least one hair particle. Before obtaining the first weight of the initial position, the terminal further obtains key point coordinates of a key point in a fusion weight curve of the virtual hair strand; and generates the fusion weight curve of the virtual hair strand based on the key point coordinates of the key point. A horizontal coordinate of the fusion weight curve is configured for indicating a position of each of the hair particles in the virtual hair strand, and a vertical coordinate of the fusion weight curve is configured for indicating a weight of a target position of the hair particle. The target position is one of the initial position and the physically simulated position.

In actual application, the key point coordinates of the key point may be customized by the user according to requirements. The terminal may provide an editing interface for the fusion weight curve. A horizontal axis in the editing interface is configured for editing a horizontal coordinate of the key point. The horizontal coordinate is the position of the hair particle in the virtual hair strand. A vertical axis in the editing interface is configured for editing a vertical coordinate of the key point. The vertical coordinate indicates the weight of the target position of the hair particle.

Figure 5:
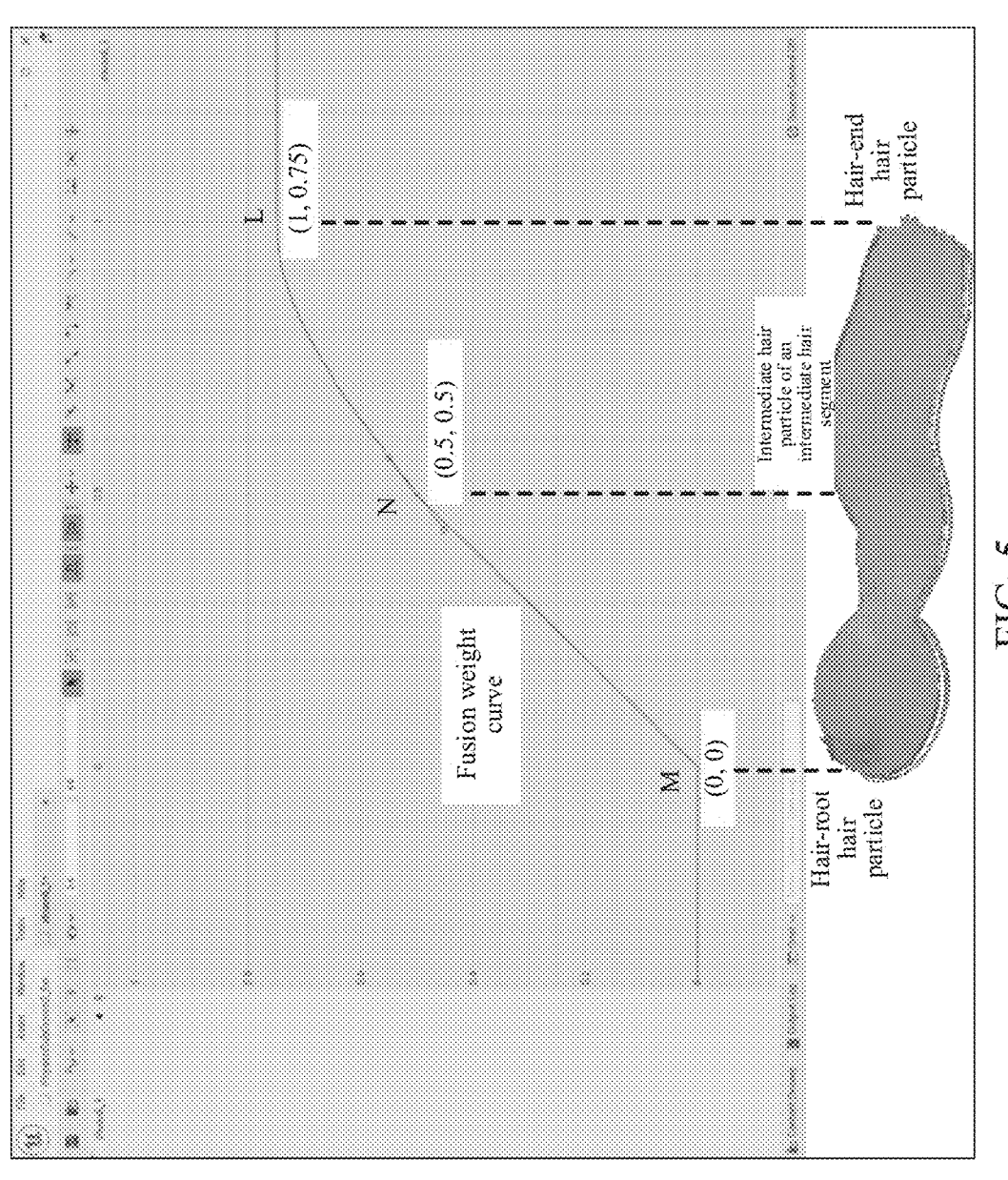
FIG. 5 is a schematic diagram of a fusion weight curve according to an embodiment of this application.

For example, FIG. 5 is a schematic diagram of a fusion weight curve according to an embodiment of this application. The fusion weight curve is generated based on key point coordinates of key points (M, N, and L). Coordinates of the key point M are (a position 0 of a hair-root hair particle in the virtual hair strand, a weight 0 of a target position of the hair-root hair particle). Coordinates of the key point N are (a position 0.5 of an intermediate hair particle in the virtual hair strand, a weight 0.5 of a target position of the intermediate hair particle). Coordinates of the key point L are (a position 1 of a hair-end hair particle in the virtual hair strand, a weight 0.75 of a target position of the hair-end hair particle). The position of the hair particle in the virtual hair strand is a ratio of an index number of the hair particle (index numbers of the hair particles from a hair root to a hair end are 0, 1, 2, . . . , n–1, and n, where n is an integer) to a total number of all hair particles in a current virtual hair strand.

Correspondingly, when the target position is the initial position, and the weight of the fusion weight curve belongs to [0, 1], the terminal may obtain the first weight of the initial position of the hair particle and the second weight of the physically simulated position of the hair particle in the following manner: determining a first position of the hair particle in the virtual hair strand, and determining a target weight corresponding to the first position based on the fusion weight curve; and using the target weight as the first weight, and using a difference between the first weight and 1 as the second weight.

Correspondingly, when the target position is the physically simulated position, and the weight of the fusion weight curve belongs to [0, 1], the terminal may obtain the first weight of the initial position of the hair particle and the second weight of the physically simulated position of the hair particle in the following manner: determining a second position of the hair particle in the virtual hair strand, and determining a weight corresponding to the second position based on the fusion weight curve; and using the weight corresponding to the second position as the second weight, and using a difference between the second weight and 1 as the first weight.

Through application of the foregoing embodiment, the user can customize the key point coordinates of the key point according to the requirements, to generate the fusion weight curve based on the key point coordinates, to fuse the hair particles in each virtual hair strand according to the fusion weight curve, thereby improving flexibility of fusion.

In some embodiments, the terminal may fuse the initial position of the hair particle and the physically simulated position of the hair particle in the following manner: determining a fusion manner between the initial position and the physically simulated position; and when the fusion manner is a linear interpolation fusion manner, fusing, for each of the hair particles, the initial position and the physically simulated position of the hair particle in the linear interpolation fusion manner, to obtain the fused position of the hair particle; or when the fusion manner is a spherical interpolation fusion manner, fusing, for each of the hair particles, the initial position and the physically simulated position of the hair particle in the spherical interpolation fusion manner, to obtain the fused position of the hair particle. In other words, in actual application, two different interpolation types, linear interpolation and spherical interpolation, may be provided. For each of the hair particles, the linear interpolation fusion manner or the spherical interpolation fusion manner may be used, to adapt to rendering requirements of different hair styles in different scenarios, thereby improving convenience of virtual hair rendering.

In actual application, the fusion manner for fusing the initial position and the physically simulated position of the hair particle includes at least one of the linear interpolation fusion manner or the spherical interpolation fusion manner. During fusion between the initial position and the physically simulated position, the fusion manner between the initial position and the physically simulated position is first determined. In actual implementation, the fusion manner may be set by the user, or may be automatically determined according to hair parameters (such as a hair type, a hair length, and a hair material) of the virtual hair. For example, a fusion manner setting control for the user to set the fusion manner may be provided. When a trigger operation for the fusion manner setting control is received, candidate fusion manners (including the linear interpolation fusion manner and the spherical interpolation fusion manner) for selection are displayed in response to the trigger operation. When a selection operation for a target candidate fusion manner is received, the selected target candidate fusion manner (for example, the linear interpolation fusion manner) is used as the fusion manner between the initial position and the physically simulated position.

Then, when the fusion manner is the linear interpolation fusion manner, for each hair particle, linear interpolation processing is performed on the initial position and the physically simulated position of the hair particle in the linear interpolation fusion manner, to obtain the fused position of the hair particle. When the fusion manner is the spherical interpolation fusion manner, for each hair particle, spherical interpolation processing is performed on the initial position and the physically simulated position of the hair particle in the spherical interpolation fusion manner, to obtain the fused position of the hair particle.

Through application of the foregoing embodiment, a plurality of fusion manners for the initial position and the physically simulated position are provided, so that different fusion manners can be provided for different virtual hair. In this way, the fused position of the hair particle obtained after fusion is more accurate, thereby improving the rendering effect of the virtual hair.

In some embodiments, the terminal may fuse the initial position of the hair particle and the physically simulated position of the hair particle in the following manner: separately performing the following processing for each of the hair particles: obtaining a first coordinate value of the initial position of the hair particle and a second coordinate value of the physically simulated position of the hair particle; obtaining a third weight of the first coordinate value and a fourth weight of the second coordinate value; weighting the first coordinate value and the second coordinate value based on the third weight and the fourth weight, to obtain a third coordinate value; and using a position indicated by the third coordinate value as the fused position of the hair particle.

The virtual hair includes a plurality of virtual hair strands, and the virtual hair strand includes at least one hair particle. In actual application, the virtual hair strand may include a plurality of hair particles. During fusion for the hair particle, each virtual hair strand may be used as a unit, to perform fusion for the hair particles in the virtual hair strand.

Figure 6:
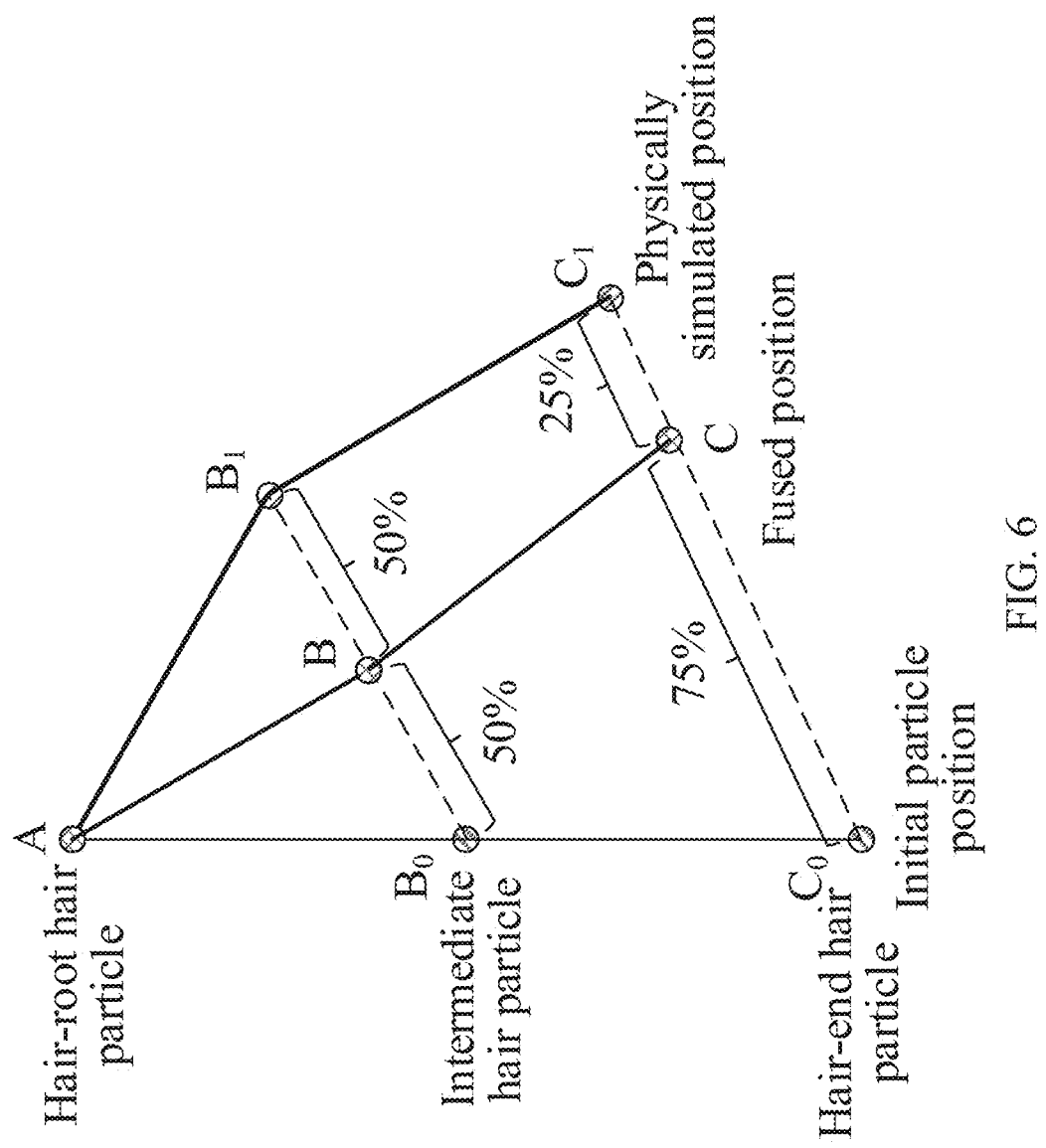
FIG. 6 is a schematic diagram 1 of fusion between an initial position and a physically simulated position according to an embodiment of this application.

For example, FIG. 6 is a schematic diagram 1 of fusion between an initial position and a physically simulated position according to an embodiment of this application. FIG. 6 shows a principle of the linear interpolation fusion manner.

$AC_0$ indicates initial positions of hair particles in the virtual hair strand. $AC_1$ indicates physically simulated positions of the hair particles in the virtual hair strand. A is a hair-root hair particle, $B_0$ and $B_1$ are intermediate hair particles, and $C_0$ and $C_1$ are hair-end hair particles.

For the hair-root hair particle A, the initial position and the physically simulated position are the same. Therefore, a fused position is unchanged, that is, A. For the intermediate hair particle, a weight of the initial position corresponding to the intermediate hair particle is 0.5, and a weight of the physically simulated position corresponding to the intermediate hair particle is 0.5. Therefore, a fused position of the intermediate hair particle is obtained by weighting a coordinate value ($B_0$) of the initial position with the weight of 0.5 and a coordinate value ($B_1$) of the physically simulated position with the weight of 0.5, that is, B. For the hair-end hair particle, a weight of the initial position corresponding to the hair-end hair particle is 0.75, and a weight of the physically simulated position corresponding to the hair-end hair particle is 0.25. Therefore, a fused position of the hair-end hair particle is obtained by weighting a coordinate value ($C_0$) of the initial position with a weight of 0.75 and a coordinate value ($C_1$) of the physically simulated position with a weight of 0.25, that is, C. Finally, a line segment set obtained by connecting A, B, and C in series is a fused hair strand obtained by fusing hair strand particles in the virtual hair strand. In this way, when an interpolation weight (namely, the weight of the initial position) is $\lambda$, a formula used for linear interpolation is as follows:

$$\overrightarrow{AB} = \overrightarrow{AB_0} * \lambda + \overrightarrow{AB_1} * (1 - \lambda).$$

However, as shown in FIG. 6, in the fused hair strand AC, a length of each segment is reduced. This is because only a measurement of position is considered in the linear interpolation, and it cannot be ensured that a distance between two adjacent hair particles in the same hair strand is unchanged after fusion. For example, AB and $AB_1$ do not have the same length. This problem can be resolved in the "spherical interpolation fusion manner". A fusion principle of the spherical interpolation fusion manner is described below.

In some embodiments, the virtual hair includes a plurality of virtual hair strands, and the virtual hair strand includes the hair-root hair particle and at least one non-hair-root hair particle. The terminal may fuse the initial position and the physically simulated position of the hair particle in the following manner: for the hair-root hair particle, determining an initial position of the hair-root hair particle as a fused position of the hair-root hair particle; and sequentially performing, for the non-hair-root hair particle, the following processing on the non-hair-root hair particle in a hair particle processing sequence from a hair root to a hair end of the virtual hair strand:

S1: Obtain a target fused position of a previous non-hair-root hair particle of the non-hair-root hair particle, and obtain a vector angle between a first vector and a second vector that use the target fused position as a shared start point, the first vector being parallel to a third vector, the second vector being parallel to a fourth vector, the third vector being a vector from an initial position of the previous non-hair-root hair particle to an initial position of the non-hair-root hair particle, and the fourth vector being a vector from a physically simulated position of the previous non-hair-root hair particle to a physically simulated position of the non-hair-root hair particle. S2: Divide the vector angle into a first angle and a second angle based on a first angle weight of the initial position and a second angle weight of the physically simulated position. S3: Determine a target vector from the target fused position to a fused position of the non-hair-root hair particle based on the first vector, the second vector, the first angle, and the second angle, and determine the fused position of the non-hair-root hair particle based on the target fused position and the target vector.

The virtual hair includes a plurality of virtual hair strands, and the virtual hair strand includes at least one hair particle. In actual application, the virtual hair strand may include a plurality of hair particles. During fusion for the hair particle, each virtual hair strand may be used as a unit, to perform fusion for the positions of the hair particles in the virtual hair strand. For each virtual hair strand, because the initial position and the physically simulated position of the hair-root hair particle are the same, the fused position is the initial position and is unchanged. For each non-hair-root hair particle in the virtual hair strand, the initial position and the physically simulated position of the non-hair-root hair particle may be fused in the spherical interpolation fusion manner, for example, fusion is performed in the following manner.

Figure 7:
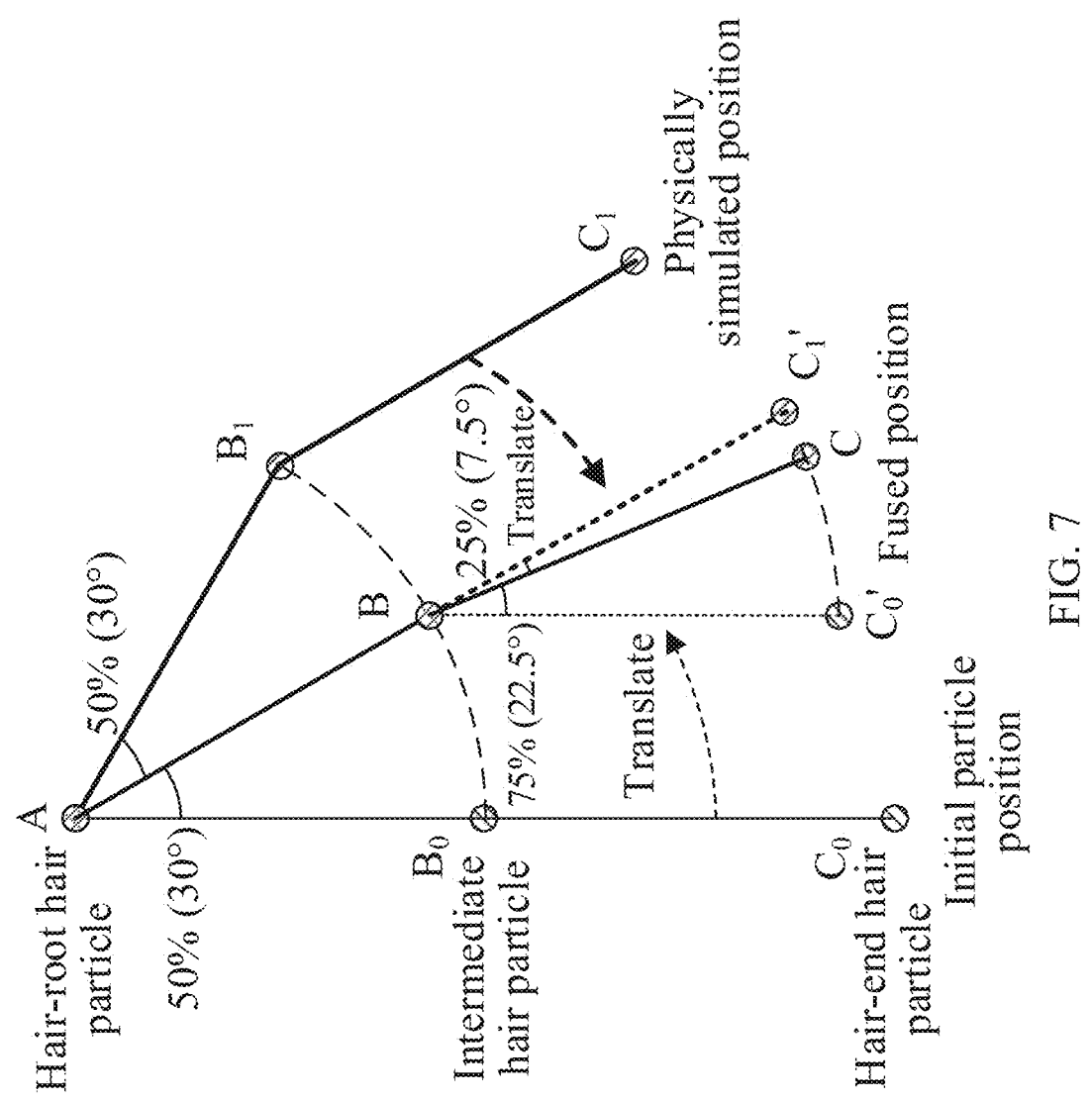
FIG. 7 is a schematic diagram 2 of fusion between an initial position and a physically simulated position according to an embodiment of this application.

FIG. 7 is a schematic diagram 2 of fusion between an initial position and a physically simulated position according to an embodiment of this application. FIG. 7 shows a principle of the spherical interpolation fusion manner. $AC_0$ indicates initial positions of hair particles in the virtual hair strand. $AC_1$ indicates physically simulated positions of the hair particles in the virtual hair strand. A is a hair-root hair particle, $B_0$ and $B_1$ are intermediate hair particles, and $C_0$ and $C_1$ are hair-end hair particles. $B_0$, $B_1$, $C_0$, and $C_1$ are non-hair-root hair particles.

An example in which the non-hair-root hair particle is $C_0$ is used. In S1, a previous non-hair-root hair particle of the non-hair-root hair particle $C_0$ is $B_0$. A target fused position of the previous non-hair-root hair particle is B. A first vector $BC_0{}'$ and a second vector $BC_1{}'$ use the target fused position B as a shared start point. The first vector $BC_0{}'$ is parallel to a third vector $B_0C_0$, and the second vector $BC_1{}'$ is parallel to a fourth vector $B_1C_1$. In S2, the first angle weight of the initial position and the second angle weight of the physically simulated position may be first obtained, and the vector angle is divided into the first angle (corresponding to the initial position) and the second angle (corresponding to the physically simulated position) based on the first angle weight of the initial position and the second angle weight of the physically simulated position. For example, the first angle weight is 75%, and the second angle weight is 25%, so that the first angle is the vector angle*75%, and the second angle is the vector angle*25%. In S3, based on the first vector, the second vector, the first angle, and the second angle, the target vector from the target fused position to the fused position of the non-hair-root hair particle is obtained by using the following formula:

$$\overrightarrow{BC} = \overrightarrow{BC_0'} * \cos(\theta * \lambda) + \overrightarrow{BC_1'} * \sin(\theta * (1 - \lambda)).$$

$\overrightarrow{BC}$ is the target vector, $\overrightarrow{BC_0}'$ is the first vector, $\overrightarrow{BC_1}'$ is the second vector, ($\theta * \lambda$) is the first angle, and ($\theta * (1-\lambda)$) is the second angle.

In S3, the fused position, namely, a fused position C, of the non-hair-root hair particle is determined based on the target fused position and the target vector.

In some embodiments, the terminal may fuse the initial position of the hair particle and the physically simulated position of the hair particle in the following manner: creating a first fusion processing thread of each of the hair particles in the virtual hair; and fusing, through the first fusion processing thread, the initial position and the physically simulated position of the corresponding hair particle in the linear interpolation fusion manner in parallel, to obtain the fused position of the hair particle.

In actual application, each hair particle may correspond to a first fusion processing thread. When fusion is performed in the linear interpolation fusion manner, the corresponding first fusion processing thread may be created for each of the hair particles in the virtual hair. In this way, the initial position and the physically simulated position of the corresponding hair particle are fused through the first fusion processing thread in the linear interpolation fusion manner in parallel, to obtain the fused position of the hair particle. Through application of the foregoing embodiment, fusion efficiency of fusing the initial position and the physically simulated position of the hair particle in the linear interpolation fusion manner can be improved, thereby improving the rendering efficiency of the virtual hair.

In some embodiments, the virtual hair includes a plurality of virtual hair strands, and the virtual hair strand includes at least one hair particle. The terminal may fuse the initial position of and the physically simulated position of the hair particle in the following manner: creating a second fusion processing thread of each of the virtual hair strands; and performing, through the second fusion processing thread of each of the virtual hair strands, the following processing on the corresponding virtual hair strand: fusing, through the second fusion processing thread of the virtual hair strand, the initial position and the physically simulated position of each of the hair particles on the virtual hair strands in the spherical interpolation fusion manner in series, to obtain the fused position of the hair particle.

In actual application, each virtual hair strand may correspond to a second fusion processing thread. During fusion in the spherical interpolation fusion manner, fusion for each hair particle in the virtual hair strand needs to be implemented based on a fused position of a previous hair particle in the virtual hair strand. Therefore, parallel processing cannot be completely performed on each of the hair particles. Based on this, for each virtual hair strand, the corresponding second fusion processing thread is created, so that the following processing is performed on the corresponding virtual hair strand through the second fusion processing thread of each virtual hair strand: fusing, through the second fusion processing thread of the virtual hair strand, the initial position and the physically simulated position of each of the hair particles on the virtual hair strands in the spherical interpolation fusion manner in series. Through application of the foregoing embodiment, the fusion efficiency of fusing the initial position and the physically simulated position of the hair particle in the spherical interpolation fusion manner can be improved, thereby improving the rendering efficiency of the virtual hair.

Operation 103: Render the virtual hair of the virtual object based on the fused positions of the hair particles, to obtain rendered virtual hair.

After the fused positions of the hair particles are obtained, in operation 103, the virtual hair is rendered based on the fused positions of the hair particles, to obtain the rendered virtual hair. In this way, rendering and producing of the virtual hair of the virtual object are implemented.

Through application of the foregoing embodiment of this application, first, the initial position of each of the hair particles in the virtual hair of the virtual object is obtained, and the physically simulated position of each of the hair particles is obtained. Then, for each of the hair particles, the initial position and the physically simulated position of the hair particle are fused, to obtain the fused position of the hair particle, so that the virtual hair is rendered based on the fused position of each of the hair particles, to obtain the rendered virtual hair. The initial position of the hair particle can support the virtual hair in a specific hair form. The physically simulated position is obtained by performing physical simulation on the position of the hair particle during the real physical movement based on the initial position of the hair particle, so that a real dynamic sense of the virtual hair can be increased. In this way, the virtual hair is rendered based on the fused position (fusion between the initial position and the physically simulated position), so that hardware processing resources of a device are fully utilized, and the combination of the real dynamic sense of the physical simulation and the specific style can be implemented when utilization of the hardware processing resources is improved. In this way, the rendered virtual hair satisfies the requirement of the specific style of the virtual hair and has the real dynamic sense, thereby improving the display effect of the rendered virtual hair.

An exemplary application of the embodiments of this application in an actual application scenario is described below. The method of hair processing for a virtual object provided in the embodiments of this application is applicable to a variety of application scenarios, such as a hair processing scenario of game images (such as game characters and monsters) in games, a producing scenario of special effects of hair in animation and film and television production, and a hair processing scenario of virtual objects (such as character and animal) in virtual reality (VR) and augmented reality (AR).

The terms involved in the embodiments of this application are first described below, including:

(1) Initial hair state: It is an initial form of a hair asset made by an artist (that is, the foregoing hair particle model), and provides an initial hair particle position of each hair particle.

(2) Skinned skeletal animation: It is also referred to as a skeletal animation, and is an animation implementation solution based on a skeletal animation and skinning weighted polygonal mesh, which can achieve an animation effect of limbs and clothes of the virtual object based on the algorithm in a game.

(3) Physically simulated position: It is obtained by performing physical simulation on a position of each hair particle in a physical movement. In other words, a dynamic sense of hair strands is reproduced based on physical simulation algorithm, to simulate a spatial position of each hair particle during the movement.

(4) Hair form fusion: It is a process of fusing the initial hair particle position of the hair particle (or an animation position corresponding to the hair particle in the skinned skeletal animation) and the physically simulated position of the hair particle by using an interpolation algorithm.

With the development of virtualization technologies, special effect requirements of virtual hair (such as hair of a virtual object) become increasingly urgent. For example, in a character customization interface of a game, during real-time playing, and in some gorgeous near-scene special effects, requirements on the realism and the art style of hair become more refined. In the related art, this is usually implemented by using a conventional art production method or a physical simulation method. (1) Conventional art production method: An artist may use art software (for example, 3ds max, maya, blender 3d, or the like) to produce a hair skeleton (including a plurality of skeletal joints) and a corresponding hair mesh model (that is, a hair patch including a plurality of polygonal meshes), and then rig, according to rigging weights, the polygonal meshes and the corresponding skeletal joints, to obtain a skinned skeletal animation, to finally present a slice-like dynamic hair effect. (2) Physical simulation method: An artist may produce an original hair particle point cloud (a particle string formed by the hair particles represents a hair strand), and then calculate, through a physical simulation algorithm, spatial positions of the hair particles during movement, to complete simulation on hair in a frame of animation. However, the related art has the following problems:

(1) A rendering effect of the conventional art production method is based on the hair patch, and hair is formed by a large number of filaments. Even when a number of patches is large, the realism is still poor. In addition, during dynamic hair production by using the conventional art production method, the artist manually produces key frame animations. In this way, time costs are very high, and the dynamic effect cannot be compared with the physical simulation method. (2) Although the positions of the hair particles obtained by using the physical simulation method are closer to the reality, the positions may not match the art style. For example, in a cartoon-style game, hair dynamics generally do not float like a real physical world. If the physical simulation method is used, the art style cannot be satisfied. For another example, when a character is running, physically simulated hair of the of character may spread out. However, if a requirement of an art style is that "hair needs to be swung horizontally left and right as expected by a designer, and a hair form remains in a bunched (rather than spread) appearance", it is difficult to achieve an expected effect by using the physical simulation method. (3) If the conventional art method is completely relied on, it is difficult to achieve the real dynamic sense. If the physical simulation method is completely relied on, the specific art style requirement of a special effect artist is not necessarily satisfied, resulting in single user experience.

Figure 8:
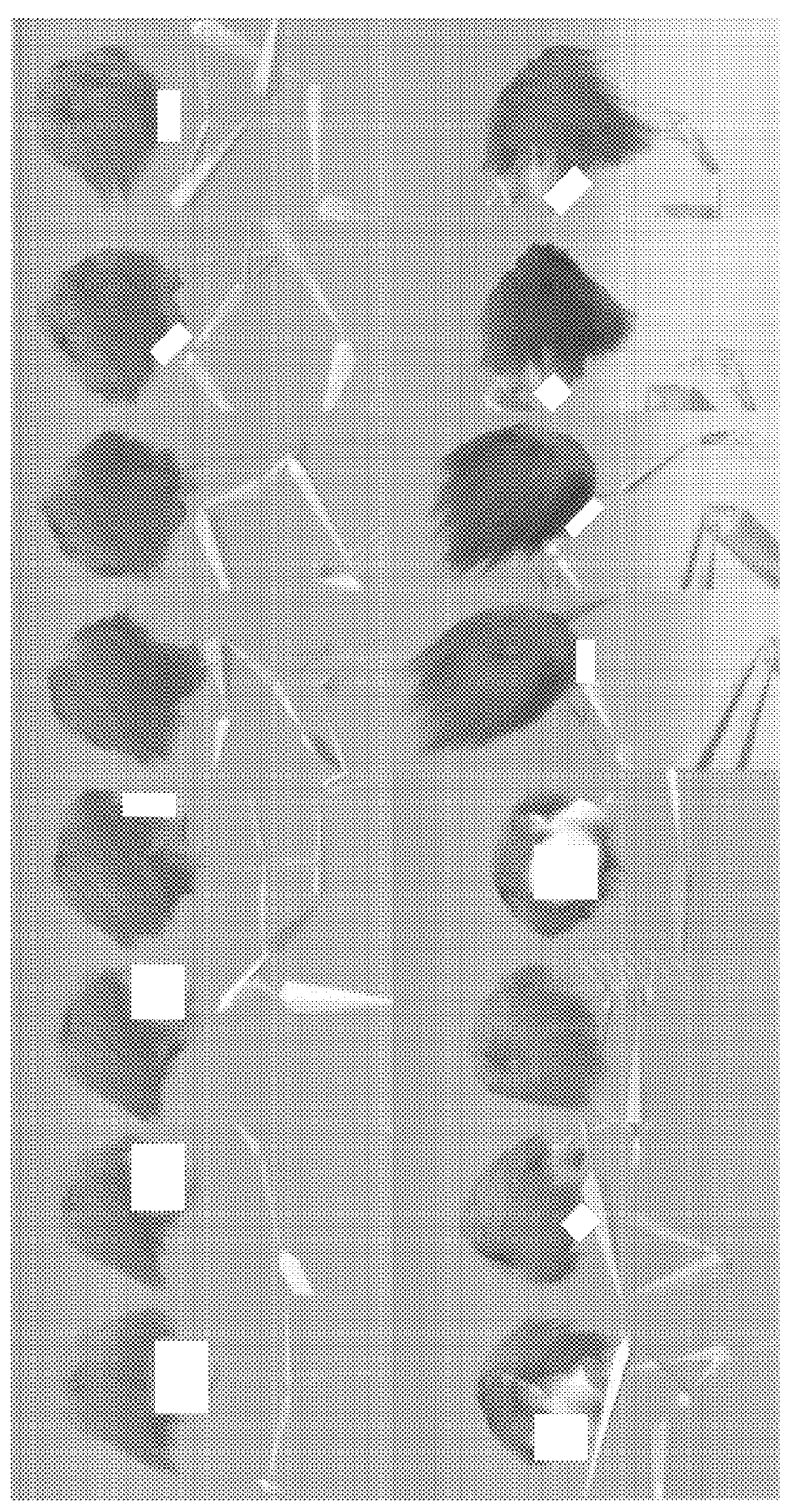
FIG. 8 is a schematic diagram of virtual hair according to an embodiment of this application.

Based on this, the embodiments of this application provide a method of hair processing for a virtual object, to resolve at least the foregoing problems. The method of hair processing for a virtual object provided in the embodiments of this application is first described below from a product side. In the embodiments of this application, the method of hair processing for a virtual object provided in the embodiments of this application is integrated into an Unreal Engine 5 (UE5) in a form of a plug-in for use. The physical simulation system based on the plug-in is "Physion". The "Physion" implements a physical simulation function of hair particles based on discrete elastic rods (DER) and a material point method (MPM), and transmits the physically simulated positions of the hair particles to a rendering buffer region of a game engine to complete rendering. FIG. 8 is a schematic diagram of virtual hair according to an embodiment of this application. The virtual hair in FIG. 8 is obtained based on a physical simulation algorithm.

Figure 9:
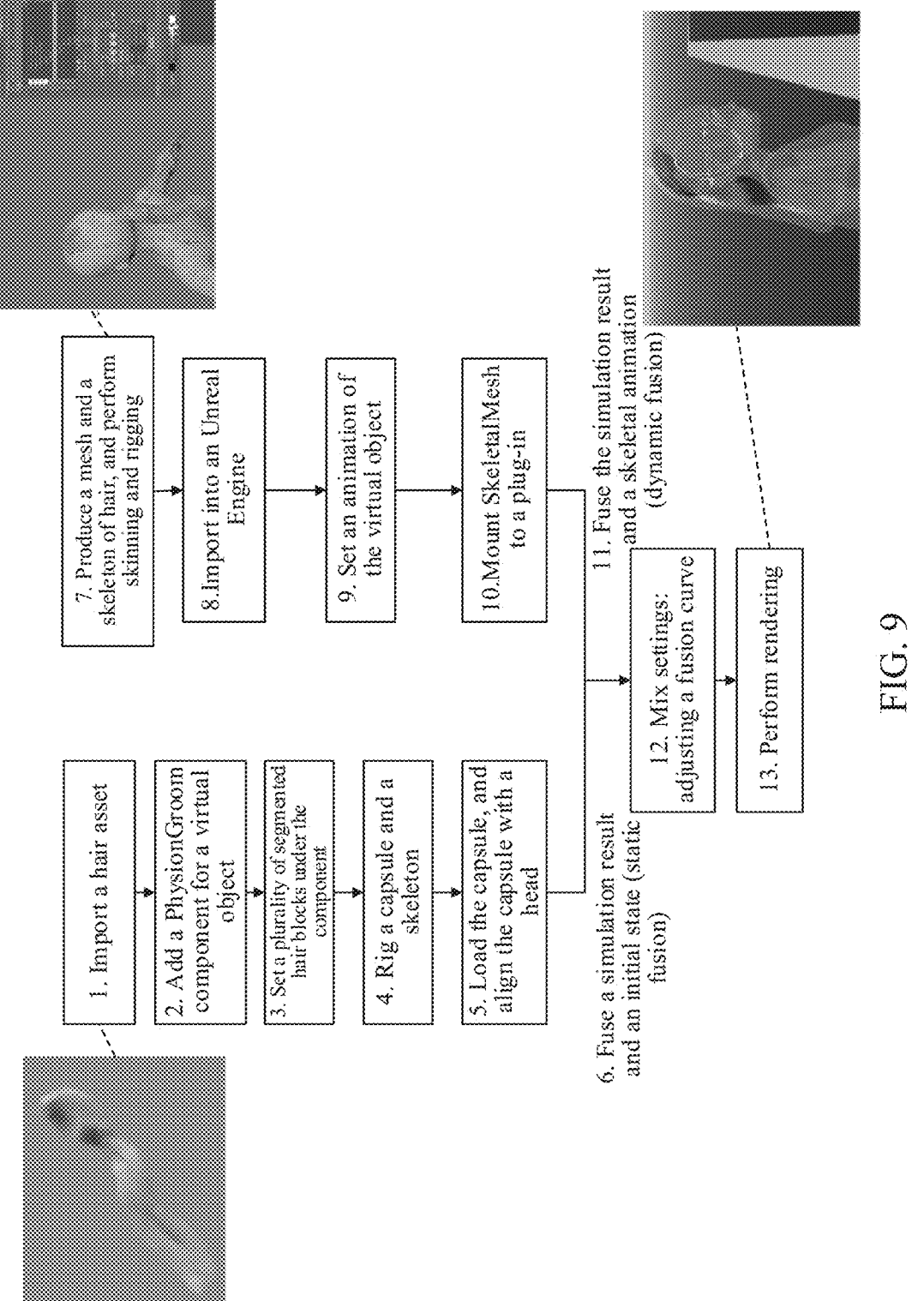
FIG. 9 is a schematic flowchart 2 of a method of hair processing for a virtual object according to an embodiment of this application.

The method of hair processing for a virtual object provided in the embodiments of this application is described below with reference to FIG. 9. FIG. 9 is a schematic flowchart 2 of a method of hair processing for a virtual object according to an embodiment of this application. The method includes the following operations. 1. Import a hair asset. 2. Add a PhysionGroom component for a virtual object. 3. Set a plurality of segmented hair blocks under the PhysionGroom component. 4. Rig a capsule and a skeleton. 5. Load the capsule, and align the capsule with a head. 6. Fuse a physically simulated position and an initial hair particle position (static fusion). 7. Produce a mesh and a skeleton of hair in art software, and perform skinning and rigging. 8. Import into the Unreal Engine. 9. Set an animation of the virtual object. 10. Mount SkeletalMesh to a plug-in. 11. Fuse the physically simulated position and a skinned skeletal animation (dynamic fusion). 12. Mix settings: adjusting a fusion curve. 13. Perform rendering. Operations 1 to 5 and operations 7 to 10 may alternatively be started simultaneously by different persons to be processed in parallel. The static fusion is implemented only by performing operations 1 to 6, and the dynamic fusion may be implemented by performing operations 1 to 11.

In actual implementation, first, the user needs to first import the hair asset (generally an alembic file, that is, a hair particle model) into a project of the UE5, and then add the PhysionGroom component for the virtual object (for example, a game character). A plurality of segmented hair blocks may be set under the component, and a capsule for driving hair to move is set and rigged to a skeletal joint. In this way, during skeletal movement, the capsule moves following the skeletal joint, and hair adsorbed on the capsule follows to perform physical simulation. During the physical simulation, an operation of form fusion (including the static fusion and the dynamic fusion) is entered. For a fusion feature, a fusion function panel is provided to adjust parameters. In addition, when fusion with the skinned skeletal animation is required, the user needs to first perform a corresponding rigging operation for the hair polygon mesh and the skeleton in the art software, and then import the assets into the UE5, to use an animation fusion function.

Figure 10:
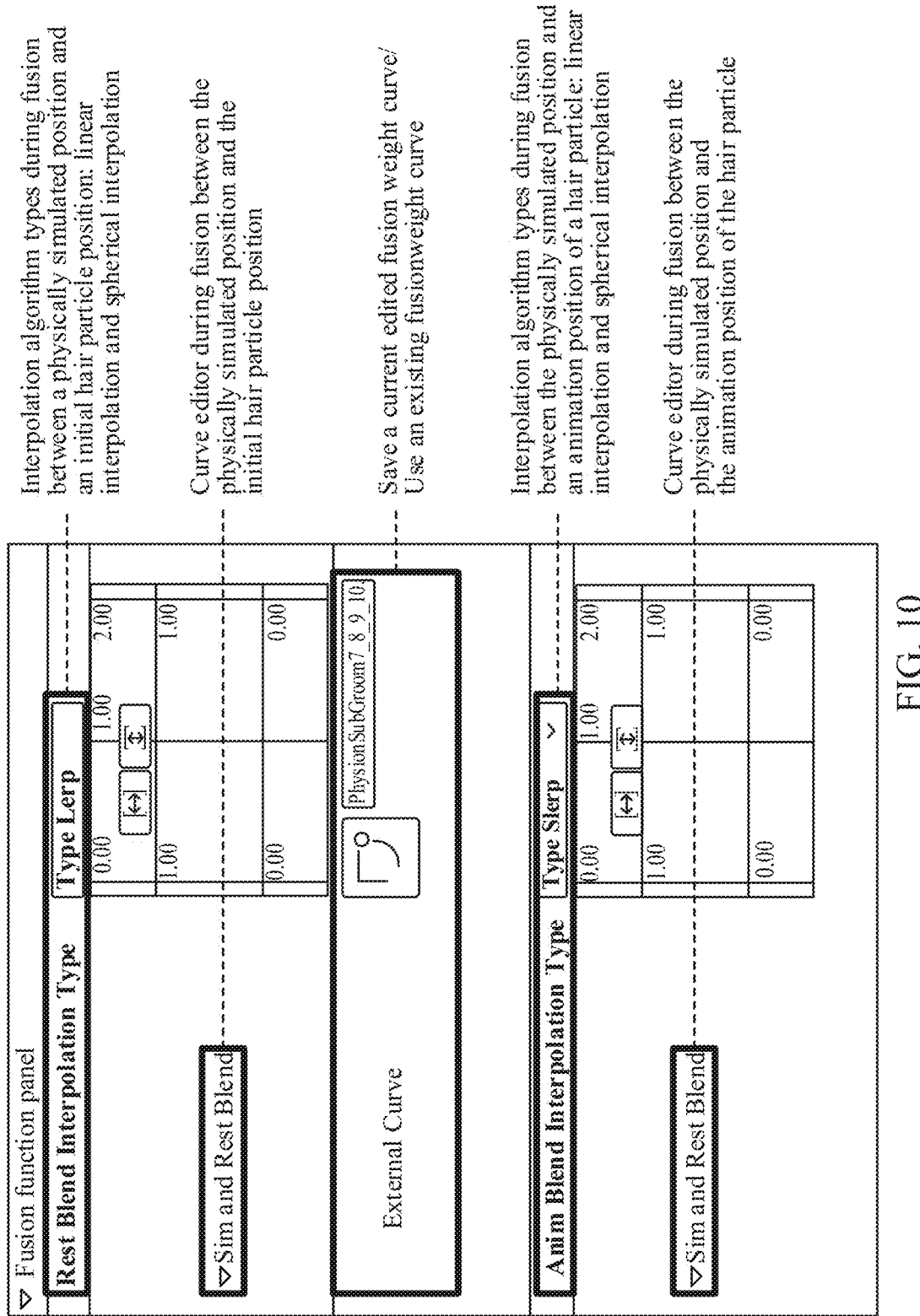
FIG. 10 is a schematic diagram of display of a fusion function panel according to an embodiment of this application.

A function of hair form fusion provided in the embodiments of this application is integrated into an interactive UI of the plug-in, and parameters are adjusted through the fusion function panel and a built-in curve editor. First, the fusion function panel is described. FIG. 10 is a schematic diagram of display of a fusion function panel according to an embodiment of this application. In the fusion function panel, two types of fusion modes are provided: (1) fusion between an initial hair particle position and a physically simulated position of a hair particle (that is, the static fusion); and (2) fusion between an animation position corresponding to the hair particle in the skinned skeletal animation and the physically simulated position (that is, the dynamic fusion, or skeletal animation fusion). For the two types of fusion modes, an "interpolation type selection drop-down box" and a "curve editor" are respectively provided. For the "interpolation type selection drop-down box" ("Rest Blend Interpolation Type" and "Anim Blend Interpolation Type" shown in FIG. 10), two alternative fusion modes appear after clicking. The fusion modes include: a linear interpolation (Lerp) fusion manner, and a spherical interpolation (SLerp) fusion manner.

Fusion manner (1): fusion between the initial hair particle position and the physically simulated position of the hair particle. To be specific, "the physically simulated position of the hair particle (simulated hair for short)" and "the initial hair particle position in the hair asset (initial hair for short)" are interpolated. An interpolation algorithm includes the following content: (a) Linear interpolation: A weight is separately set for the simulated hair and the initial hair (two weights add up to 1), so that linear interpolation is performed on the position of each hair particle based on respective weights. A higher weight of the simulated hair indicates that a hair rendering result is closer to the simulated hair; otherwise, the hair rendering result is closer to the initial hair. A fusion result of linear interpolation can better maintain a hair form, and a specific section of hair can be fixed by reducing the weight of the simulated hair. (b) Spherical interpolation: A weight is set for the simulated hair and the initial hair separately (two weights add up to 1), so that angle interpolation is performed on segment-by-segment hair on each hair strand based on respective weights. A higher weight of the simulated hair indicates that a hair rendering result is closer to the simulated hair; otherwise, the hair rendering result is closer to the initial hair. A fusion result of spherical interpolation can ensure stability of a hair length.

Fusion mode (2): fusion between the animation position (animation hair for short) corresponding to the hair particle in the skinned skeletal animation and the physically simulated positions. The fusion mode (2) is to provide the user with convenience to affect a final simulation rendering effect by adding an external animation. For example, when a character moves, if a hair simulation result does not swing in an expected direction, the external animation may be added through the function for mixing, and finally an effect of both a sense of float caused by the simulation and swinging in a specific animation sequence is achieved. The fusion mode (2) and the fusion mode (1) may be used at the same time. In the fusion mode (2), a finally rendered position of the hair particle is an interpolation result of the "physically simulated position" and the "animation position corresponding to the hair particle in the skinned skeletal animation". An interpolation algorithm includes the following content: (a) Linear interpolation: A weight is separately set for the simulated hair and the animation hair (two weights add up to 1), so that linear interpolation is performed on the position of each hair particle based on respective weights. A higher weight of the simulated hair indicates that a hair rendering result is closer to the simulated hair; otherwise, the hair rendering result is closer to the animation hair. (b) Spherical interpolation: A weight is set for the simulated hair and the animation hair separately (two weights add up to 1), so that angle interpolation is performed on segment-by-segment hair on each hair strand based on respective weights. A higher weight of the simulated hair indicates that a hair rendering result is closer to the simulated hair; otherwise, the hair rendering result is closer to the animation hair.

Second, the weight curve editor is described. Referring to FIG. 5, editing and adjustment of the fusion weight of the fusion function may be implemented through a "weight curve editor" shown in FIG. 5. Creation and editing of the curve may be performed on an editor interface of the weight curve editor. For example, in the curve editor, a key point may be added by right click on a blank space, and key point coordinates of the key point are set. (1) An editor horizontal axis (an X coordinate value of the key point) represents a ratio of an index number of a hair particle (index numbers of hair particles from a hair root to a hair end are respectively $0, 1, 2, \ldots, n-1$, and n, where n is an integer) on each virtual hair strand to a total number of all hair particles in a current virtual hair strand. Although the number of hair particles in each hair strand is different, the number may be normalized to [0, 1]. For example, if each hair strand includes three hair particles, $X=0.5$ indicates the second hair particle in each hair strand. (2) An editor vertical axis (a Y coordinate value of the key point) represents a weight of the hair particle at a current position for a target position (one of the initial position and the physically simulated position).

The method of hair processing for a virtual object provided in the embodiments of this application is described below from a technical side. Fusion manner (1): fusion between the initial hair particle position and the physically simulated position of the hair particle. In actual implementation, the fusion may be implemented in the linear interpolation fusion manner or the spherical interpolation fusion manner.

FIG. 6 shows a principle of the linear interpolation fusion manner. $AC_0$ indicates initial positions of hair particles in the virtual hair strand. $AC_1$ indicates physically simulated positions of the hair particles in the virtual hair strand. A is the hair-root hair particle, $B_0$ and $B_1$ are intermediate hair particles, and $C_0$ and $C_1$ are hair-end hair particles.

For the hair-root hair particle A, the initial position and the physically simulated position are the same. Therefore, a fused position is unchanged, that is, A. For the intermediate hair particle, a weight of the initial position corresponding to the intermediate hair particle is 0.5, and a weight of the physically simulated position corresponding to the intermediate hair particle is 0.5. Therefore, a fused position of the intermediate hair particle is obtained by weighting a coordinate value ($B_0$) of the initial position with the weight of 0.5 and a coordinate value ($B_1$) of the physically simulated position with the weight of 0.5, that is, B. For the hair-end hair particle, a weight of the hair-end hair particle is 0.75, and a weight of the physically simulated position corresponding to the hair-end hair particle is 0.25. Therefore, a fused position of the hair-end hair particle is obtained by weighting a coordinate value ($C_0$) of the initial position with a weight of 0.75 and a coordinate value ($C_1$) of the physically simulated position with a weight of 0.25, that is, C. Finally, a line segment set obtained by connecting A, B, and C in series is a fused hair strand obtained by fusing hair strand particles in the virtual hair strand. In this way, when an interpolation weight (namely, the weight of the initial position) is $\lambda$, a formula used for linear interpolation is as follows:

$$\overrightarrow{AB} = \overrightarrow{AB_0} * \lambda + \overrightarrow{AB_1} * (1 - \lambda).$$

However, as shown in FIG. 6, in the fused hair strand AC, a length of each segment is reduced. This is because only a measurement of position is considered in the linear interpolation, and it cannot be ensured that a distance between two adjacent hair particles in the same hair strand is unchanged after fusion. For example, AB and $AB_1$ do not have the same length. This problem can be resolved in the "spherical interpolation fusion manner". A fusion principle of the spherical interpolation fusion manner is described below.

FIG. 7 shows a principle of the spherical interpolation fusion manner. Different from the linear interpolation fusion manner, the final fused position is obtained by performing angle interpolation on the angle between the initial hair and the simulated hair. As shown in FIG. 7, $AC_0$ represents initial positions of hair particles in the virtual hair strand. $AC_1$ indicates physically simulated positions of the hair particles in the virtual hair strand. A is a hair-root hair particle, $B_0$ and $B_1$ are intermediate hair particles, and $C_0$ and $C_1$ are hair-end hair particles. $B_0$, $B_1$, $C_0$, and $C_1$ are non-hair-root hair particles.

(1) The hair particle A is the hair-root particle, a position of which is recorded in the hair asset, and a position of the hair root particle in a local space of the model does not change with the physical simulation.

(2) It is assumed that an edge $AB_0$ is a start edge, an edge $AB_1$ is an end edge, and a vector AB is obtained through spherical interpolation, where weights of the spherical interpolation may be respectively 0.5 and 0.5. For example, if an angle between $AB_0$ and $AB_1$ is 60°, the vector AB faces a direction of 30° in the middle of the $AB_0$ and $AB_1$. Therefore, a fused position of a hair particle B can be calculated by using the point A whose position is unchanged and the vector AB.

(3) A position of a hair particle C is similar to the hair particle B. Spherical interpolation is first performed based on $B_0C_0$ and $B_1C_1$, where weights of the spherical interpolation are 0.75 (corresponding to a physically simulated position) and 0.25 (corresponding to an initial position). In other words, a fused position is closer to the physically simulated position. After a vector BC is obtained through interpolation, the vector BC is added to the position of the hair particle B, to obtain a fused position of the hair-end particle C.

A formula used for the spherical interpolation in a form of a vector is as follows:

An angle between two vectors $\overrightarrow{AB_0}$ and $\overrightarrow{AB_1}$ is first obtained:

$$\theta = a\ \cos(\text{dot}(\overrightarrow{AB_0}, \overrightarrow{AB_1})).$$

dot( ) is dot product calculation, and a cos( ) is an inverse cosine function.

When the weight of the physically simulated position is $\lambda$, the vector $\overrightarrow{AB}$ obtained through final spherical interpolation is:

$$\overrightarrow{AB} = \overrightarrow{AB_0} * \cos(\theta * \lambda) + \overrightarrow{AB_1} * \sin(\theta * (1 - \lambda)).$$

Fusion mode (2): fusion between the animation position corresponding to the hair particle in the skinned skeletal animation and the physically simulated positions. As shown in FIG. 4, when the animation position corresponding to the hair particle in the skinned skeletal animation is determined, in addition to the hair asset (the foregoing hair particle model), the hair skeleton and the hair mesh model of the hair also need to be relied on. FIG. 11 is a schematic flowchart 3 of a method of hair processing for a virtual object according to an embodiment of this application. The method includes the following operations.

(1) Import a hair mesh model and a hair skeleton, generally stored in an FBX format.

(2) Align the hair mesh model with a hair asset.

(3) Determine a skeletal joint corresponding to each hair particle and a corresponding rigging weight.

(4) Obtain a skinning matrix of each skeletal joint through an interface of a UE5.

(5) Obtain an animation position of the hair particle corresponding to the skinned skeletal animation by using an animation skinning formula based on a hair particle position of the hair particle in a model coordinate system, the skinning matrix, and the rigging weight of the hair particle corresponding to the skeletal joint. The animation position of the hair particle maintains relatively synchronous movement with a hair mesh.

The animation skinning formula is as follows:

$$V_M^c = \sum_{i=1}^{N} w_{ij} \cdot V_M^B \cdot (B_{j \to M})^{-1} \cdot C_{j \to M}.$$

$w_{ij}$ is a rigging weight between the hair particle and an $i^{th}$ skeletal joint.

$$V_M^B$$

is the hair particle position in a model space when the hair particle is in a rigged posture. $B_{j \to M}$ is a transform matrix for transforming the hair particle from a skeletal local space of the it rigged skeletal joint to the model space when the hair particle is in the rigged posture. After $$V_M^B$$

and $(B_{j \to M})^{-1}$ are multiplied, coordinates of the hair particle in the rigged posture in the local space of the it skeletal joint are obtained. $C_{j \to M}$ is a transform matrix for transforming the hair particle in a current animation frame posture from the skeletal local space of the it rigged skeletal joint into the model space. $(B_{j \to M})^{-1} \cdot C_{j \to M}$ is the skinning matrix.

(6) Perform "linear interpolation" or "spherical interpolation" and adjust a related fusion curve based on the obtained animation position and the physically simulated position of the hair particle, to obtain a final fused position.

In actual application, the method of hair processing for a virtual object provided in the embodiments of this application acts on each hair particle. Therefore, performance overheads are large if processing is performed in parallel on a central processing unit (CPU). Therefore, in actual application, a parallel technology such as a compute shader is used to speed up algorithm processing in the embodiments of this application. To be specific, based on a high level shading language (HLSL), by writing USF and USH scripts of the UE5, the method of hair processing for a virtual object provided in the embodiments of this application is run on a graphics processing unit (GPU), so that the performance is multiply improved. FIG. 12 is a schematic diagram of performing parallel processing on virtual hair according to an embodiment of this application. According to the specification of creating thread of the compute shader in HLSL, an equal number of thread groups are first created according to a virtual hair strand number of the virtual hair, and 32 parallel threads are created for each thread group, to simultaneously process all hair particles on each virtual hair strand. For a hair strand having more than 32 hair particles, the shader cycles processing. To be specific, 32 particles are first processed, and fusion calculation of the remaining particles is then processed.

Figure 13:
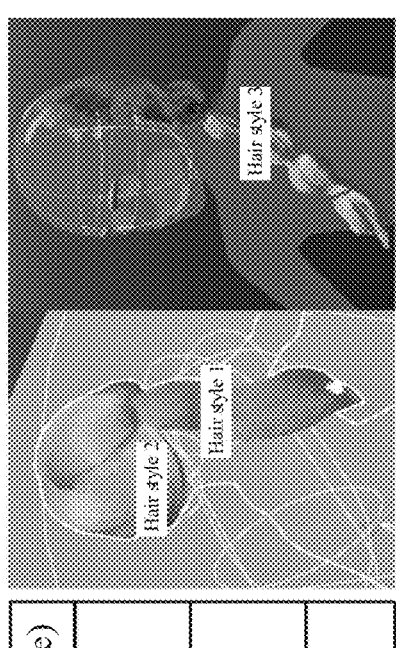
FIG. 13 is a schematic diagram of hair processing duration according to an embodiment of this application.

When spherical interpolation is used to perform fusion calculation, because calculation of the fused position of each hair particle depends on the fused position of a previous hair particle, characteristics of the parallel calculation lead to the inability to simultaneously process algorithms that have state dependence on adjacent threads. Otherwise, during calculation of a new hair particle, interpolation of the previous hair particle may not be completed, resulting in a result error or a program crash. Therefore, each virtual hair strand may be processed in parallel, but all the hair particles on each virtual hair strand are processed in series. Based on this, processing time consumption is greatly reduced through parallel processing of the shader. FIG. 13 is a schematic diagram of hair processing duration according to an embodiment of this application. For hair including thousands of hair particles, time consumption of the fusion algorithm is only 30 to 40 microseconds/frame, having almost no significant impact on performance for a game frame rate of 60 FPS, which averages 16.7 milliseconds/frame.

In actual application, (1) a physical simulation module may be implemented by using Groom, TressFx, or the like of the UE5; (2) another UI interactive manner, such as a slide bar, may be used, to replace a function of the curve editor; and (3) fusion between the physically simulated position and the skeletal animation may alternatively be replaced with fusion between the physically simulated position and a polygonal mesh animation (Blend Shape).

Figure 14A:
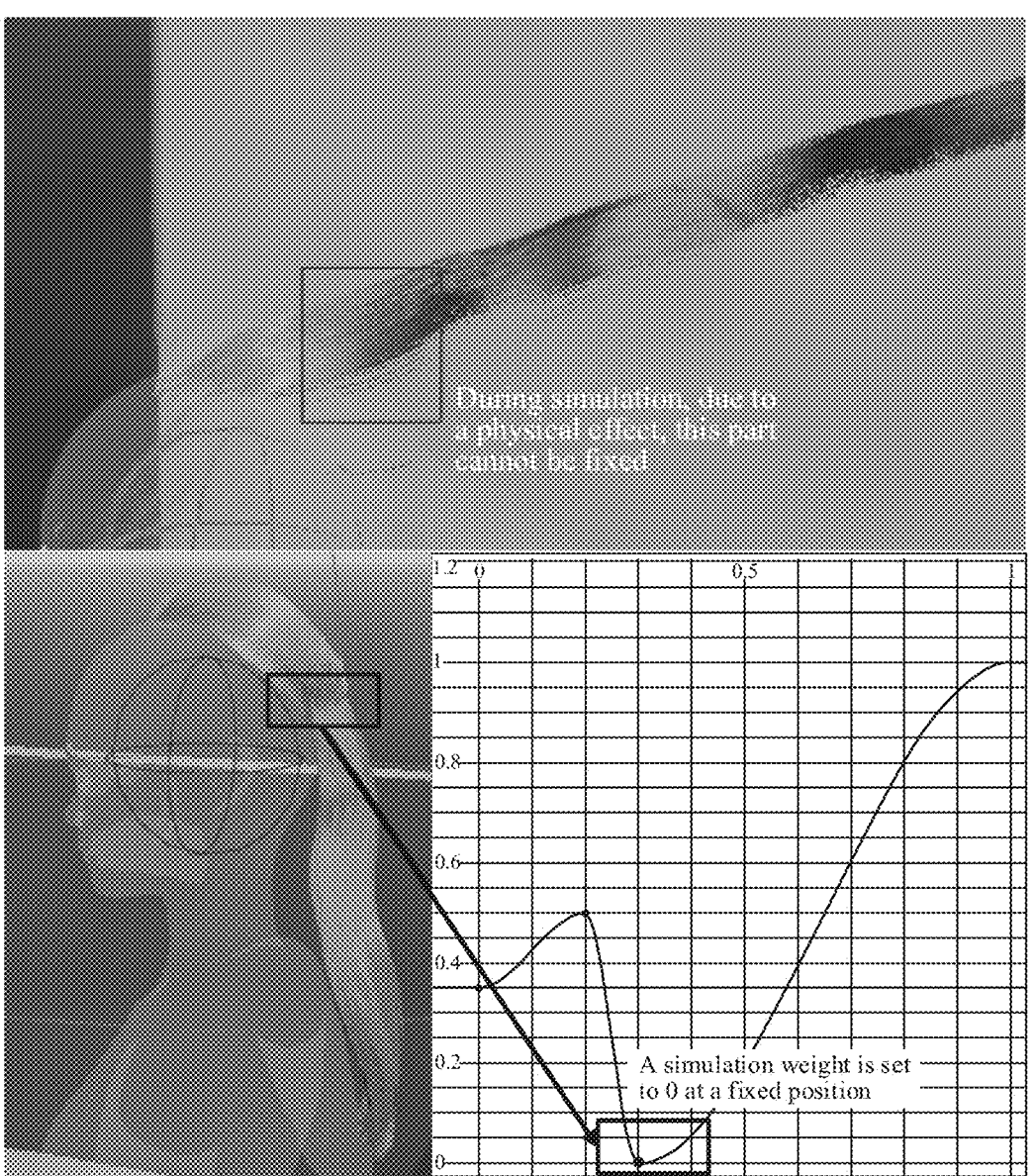
FIG. 14A is a schematic diagram 1 of virtual hair according to an embodiment of this application.
Figure 14B:
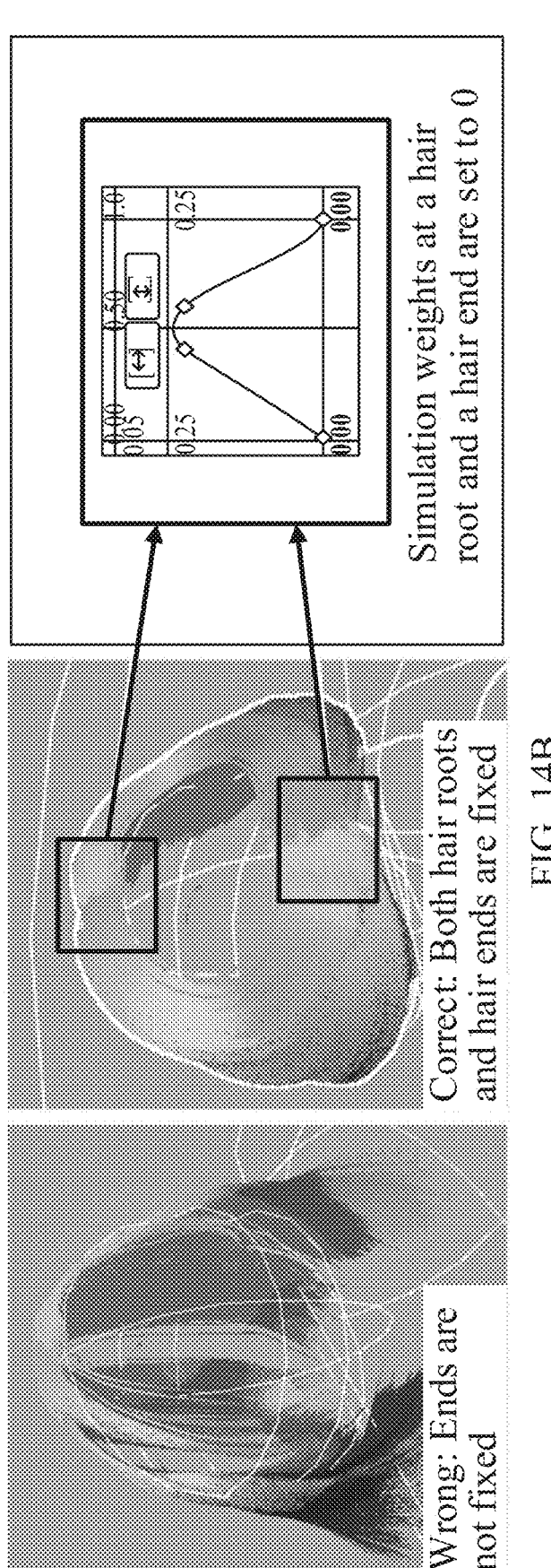
FIG. 14B is a schematic diagram 2 of virtual hair according to an embodiment of this application.
Figure 14C:
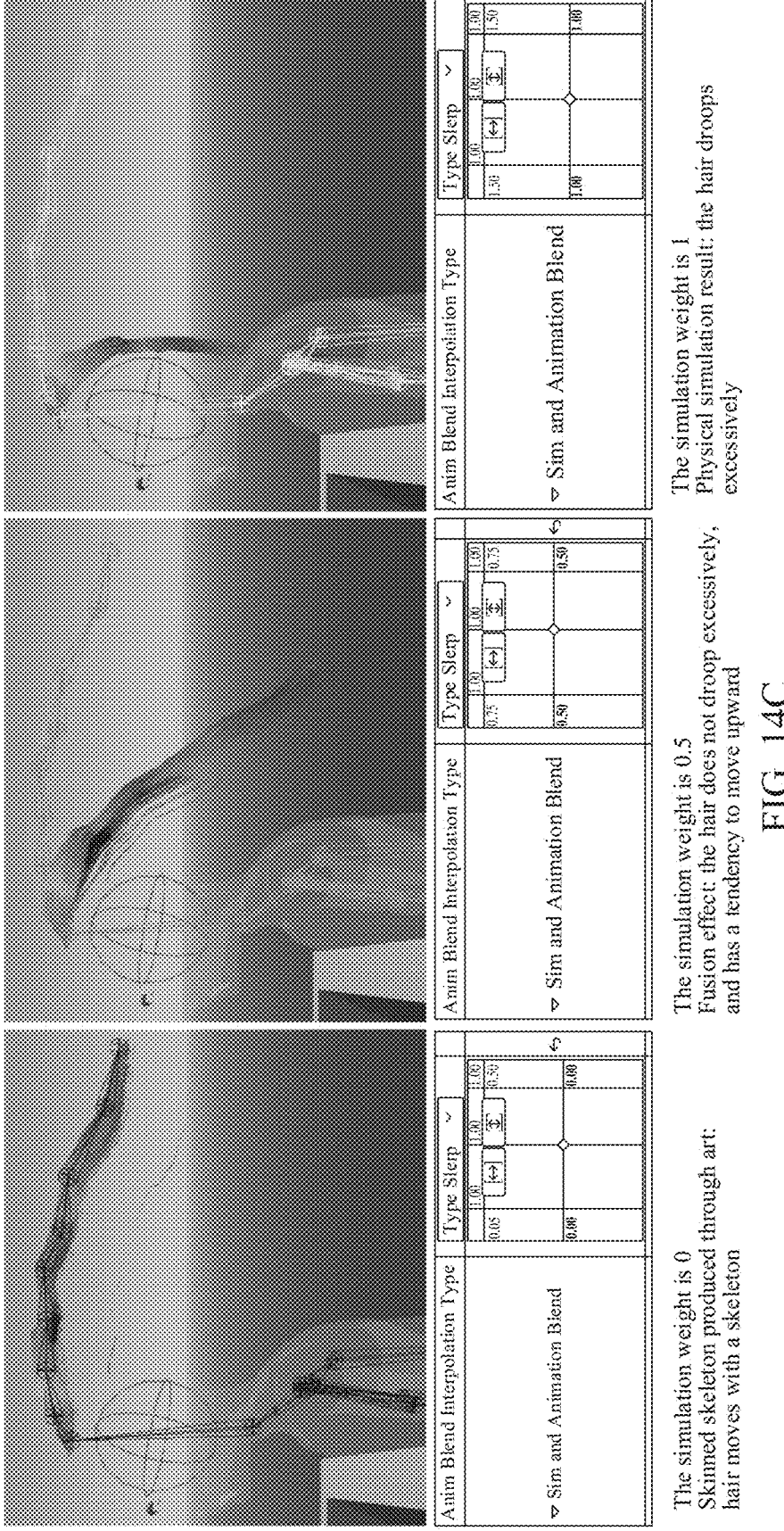
FIG. 14C is a schematic diagram 3 of virtual hair according to an embodiment of this application.

Through application of the foregoing embodiment of this application, more hair style support of virtual hair and dynamic hair adjustment means are provided, thereby expanding a boundary of use of the physical simulation method to simulate an effect of the hair. For example, (1) as shown in FIG. 14A, for a hair type with long hair and fixed with a headband in the middle, linear interpolation may be selected for fusion, and weights of physically simulated positions of hair particles in a headband portion are reduced (for example, adjusted to 0) in the fusion weight curve, to achieve an expected effect. (2) As shown in FIG. 14B, for a hair style with two ends fixed, the physical simulation can only fix the hair root. However, the physically simulated position and the initial state position are fused through linear interpolation, and weights of the physically simulated positions of the hair particles at two ends are adjusted to a minimum (for example, to 0) in the fusion weight curve, to achieve an expected effect. (3) As shown in FIG. 14C, for hair whose simulation result does not satisfy an expected effect of the user, a skinned skeletal animation fusion method may be used, and the spherical interpolation fusion manner is selected, to import an animation form of virtual hair intended by the user. In combination with a physically simulated result, an intermediate form is generated, which has a real sense and a floating sense brought by the physical simulation and a movement tendency expected by the user. (4) As shown in FIG. 14D, for animation skinning fusion for long hair, spherical interpolation is suitable for fusion. As shown in FIG. 14D, the spherical interpolation has a more correct fusion effect than the linear interpolation, and a length of the hair strand by using the linear interpolation is shorter than an actual expected skeletal length.

The weight corresponding to the physically simulated position may also be referred to as a simulation weight.

In this way, in the embodiments of this application, (1) compared with the conventional art production solution and with the mere use of the physical simulation solution, realism brought by the physical simulation is retained, and specific art style requirements can be retained according to user requirements. In addition, a plurality of common hair types are supported, such as long hair, short hair, braids, bundles, and updos. (2) A weight curve editor and two different interpolation types, linear and spherical, are provided. The user can use different fusion types for different hair types in different scenarios by using the weight curve editor and the two different interpolation types, which is convenient to use, and has good feedback from artists and special effect artists. (3) A fusion algorithm applied to each hair particle is parallelized by using a GPU parallel processing program written by a compute shader, thereby minimizing performance consumption.

In the embodiments of this application, relevant data such as user information is involved. When the embodiments of this application are applied to products or technologies, user permission or consent needs to be obtained, and collection, use, and processing of relevant data need to comply with relevant laws, regulations, and standards of relevant countries and regions.

An exemplary structure implemented as a software module of the apparatus 553 of hair processing for a virtual object provided in the embodiments of this application is still described below. In some embodiments, as shown in FIG. 2, the software module in the apparatus 553 of hair processing for a virtual object stored in the memory 550 may include:

the obtaining module 5531, configured to obtain an initial position of each of hair particles in virtual hair of a virtual object, and obtain a physically simulated position of the hair particle, the physically simulated position being obtained by performing physical simulation on a position of the hair particle in a physical movement based on the initial position of the hair particle; the fusion module 5532, configured to fuse, for each of the hair particles, the initial position and the physically simulated position of the hair particle, to obtain a fused position of the hair particle; and the rendering module 5533, configured to render the virtual hair of the virtual object based on the fused positions of the hair particles, to obtain rendered virtual hair.

In some embodiments, the obtaining module 5531 is further configured to obtain a hair particle model created for the virtual hair of the virtual object, the hair particle model including the hair particles in the virtual hair; and determine, for each of the hair particles, a model position of the hair particle in the hair particle model as the initial position of the hair particle.

In some embodiments, the obtaining module 5531 is further configured to obtain a hair particle model, a hair mesh model, and a hair skeleton of the virtual hair of the virtual object, the hair particle model including the hair particles in the virtual hair, the hair mesh model including a plurality of mesh vertexes, and the hair skeleton including a plurality of skeletal joints; and each of the mesh vertexes being rigged with at least one related skeletal joint, to form a skinned skeletal animation of the virtual hair, and each of the skeletal joints having a corresponding rigging weight; determine, for each of the hair particles, a hair particle position of the hair particle in a model coordinate system of the hair mesh model, determine at least one target skeletal joint related to the hair particle from the plurality of skeletal joints, and determine a target rigging weight of each of the at least one target skeletal joint; and determine, for each of the hair particles, an animation position of the hair particle in the skinned skeletal animation based on the hair particle position and the target rigging weight of each of the at least one target skeletal joint, and use the animation position of the hair particle as the initial position of the hair particle.

In some embodiments, the obtaining module 5531 is further configured to move the hair particle model, to align the hair particle model with the hair mesh model; obtain coordinate transformation information generated during the movement and an initial hair particle position of each of the hair particles in the hair particle model; and determine the hair particle position of the hair particle in the model coordinate system of the hair mesh model based on the initial hair particle position and the coordinate transformation information.

In some embodiments, the obtaining module 5531 is further configured to determine a target mesh vertex closest to the hair particle from the plurality of mesh vertexes; and determine at least one skeletal joint related to the target mesh vertex as the at least one target skeletal joint related to the hair particle, and determine a rigging weight of each of the at least one skeletal joint related to the target mesh vertex as the target rigging weight corresponding to each of the at least one target skeletal joint.

In some embodiments, the obtaining module 5531 is further configured to separately perform the following processing on each of the at least one target skeletal joint: multiplying the hair particle position and the target rigging weight of the target skeletal joint, to obtain an intermediate particle position of the hair particle relative to the target skeletal joint; obtaining a skinning matrix of the target skeletal joint, and multiplying the intermediate particle position and the skinning matrix, to obtain an intermediate animation position; and adding intermediate animation positions corresponding to the at least one target skeletal joint, to obtain the animation position of the hair particle in the skinned skeletal animation.

In some embodiments, the obtaining module 5531 is further configured to separately perform the following processing for each of the hair particles: obtaining a boundary restriction parameter and a movement parameter of the hair particle, the boundary restriction parameter being a farthest position reachable by the hair particle during the movement, and the movement parameter including a movement speed and a movement direction of the hair particle; and adjusting the initial position of the hair particle based on the boundary restriction parameter and the movement parameter, to obtain the physically simulated position of the hair particle.

In some embodiments, the fusion module 5532 is further configured to separately performing the following processing for each of the hair particles: obtaining a first weight of the initial position of the hair particle and a second weight of the physically simulated position of the hair particle; and weighting the initial position and the physically simulated position based on the first weight and the second weight, to obtain the fused position of the hair particle.

In some embodiments, the virtual hair includes a plurality of virtual hair strands, and the virtual hair strand includes at least one hair particle. The fusion module 5532 is further configured to obtain key point coordinates of a key point in a fusion weight curve of the virtual hair strand before obtaining the first weight of the initial position of the hair particle; and generate the fusion weight curve of the virtual hair strand based on the key point coordinates of the key point. A horizontal coordinate of the fusion weight curve is configured for indicating a position of each of the hair particles in the virtual hair strand, and a vertical coordinate of the fusion weight curve is configured for indicating a weight of a target position of the hair particle. The target position is one of the initial position and the physically simulated position. Correspondingly, when the target position is the initial position, and the weight of the fusion weight curve belongs to [0, 1], the fusion module 5532 is further configured to determine a first position of the hair particle in the virtual hair strand, and determine a target weight corresponding to the first position based on the fusion weight curve; and use the target weight as the first weight, and use a difference between the first weight and 1 as the second weight.

In some embodiments, the fusion module 5532 is further configured to determine a fusion manner between the initial position and the physically simulated position; when the fusion manner is a linear interpolation fusion manner, fuse, for each of the hair particles, the initial position and the physically simulated position of the hair particle in the linear interpolation fusion manner, to obtain the fused position of the hair particle; or when the fusion manner is a spherical interpolation fusion manner, fuse, for each of the hair particles, the initial position and the physically simulated position of the hair particle in the spherical interpolation fusion manner, to obtain the fused position of the hair particle.

In some embodiments, the fusion module 5532 is further configured to, for each of the hair particles, separately perform the following processing: obtaining a first coordinate value of the initial position of the hair particle and a second coordinate value of the physically simulated position of the hair particle; obtaining a third weight of the first coordinate value and a fourth weight of the second coordinate value; weighting the first coordinate value and the second coordinate value based on the third weight and the fourth weight, to obtain a third coordinate value; and using a position indicated by the third coordinate value as the fused position of the hair particle.

In some embodiments, the virtual hair includes a plurality of virtual hair strands, and the virtual hair strand includes the hair-root hair particle and at least one non-hair-root hair particle. The fusion module 5532 is further configured to determine, for the hair-root hair particle, an initial position of the hair-root hair particle as a fused position of the hair-root hair particle; and sequentially perform, for the non-hair-root hair particle, the following processing on the non-hair-root hair particle in a hair particle processing sequence from a hair root to a hair end of the virtual hair strand: obtaining a target fused position of a previous non-hair-root hair particle of the non-hair-root hair particle, and obtaining a vector angle between a first vector and a second vector that use the target fused position as a shared start point, the first vector being parallel to a third vector, the second vector being parallel to a fourth vector, the third vector being a vector from an initial position of the previous non-hair-root hair particle to an initial position of the non-hair-root hair particle, and the fourth vector being a vector from a physically simulated position of the previous non-hair-root hair particle to a physically simulated position of the non-hair-root hair particle; dividing the vector angle into a first angle and a second angle based on a first angle weight of the initial position and a second angle weight of the physically simulated position; and obtaining a target vector from the target fused position to a fused position of the non-hair-root hair particle based on the first vector, the second vector, the first angle, and the second angle, and determining the fused position of the non-hair-root hair particle based on the target fused position and the target vector.

In some embodiments, the fusion module 5532 is further configured to create a first fusion processing thread of each of the hair particles in the virtual hair; and fuse, through the first fusion processing thread, the initial position and the physically simulated position of the corresponding hair particle in the linear interpolation fusion manner in parallel, to obtain the fused position of the hair particle.

In some embodiments, the virtual hair includes a plurality of virtual hair strands, and the virtual hair strand includes at least one hair particle. The fusion module 5532 is further configured to create a second fusion processing thread of each of the virtual hair strands; and perform, through the second fusion processing thread of each of the virtual hair strands, the following processing on the corresponding virtual hair strand: fusing, through the second fusion processing thread of the virtual hair strand, the initial position and the physically simulated position of each of the hair particles on the virtual hair strands in the spherical interpolation fusion manner in series, to obtain the fused position of the hair particle.

Through application of the foregoing embodiment of this application, first, the initial position of each of the hair particles in the virtual hair of the virtual object is obtained, and the physically simulated position of each of the hair particles is obtained. Then, for each of the hair particles, the initial position and the physically simulated position of the hair particle are fused, to obtain the fused position of the hair particle, so that the virtual hair is rendered based on the fused position of each of the hair particles, to obtain the rendered virtual hair. The initial position of the hair particle can support the virtual hair in a specific hair form. The physically simulated position is obtained by performing physical simulation on the position of the hair particle during the real physical movement based on the initial position of the hair particle, so that a real dynamic sense of the virtual hair can be increased. In this way, the virtual hair is rendered based on the fused position (fusion between the initial position and the physically simulated position), so that combination of the real dynamic sense of the physical simulation and a specific style can be implemented. In this way, the rendered virtual hair satisfies a requirement of the specific style of the virtual hair and has the real dynamic sense, thereby improving the display effect of the rendered virtual hair.

An embodiment of this application further provides a computer program product. The computer program product includes a computer-executable instruction. The computer program or the computer-executable instruction is stored in a computer-readable storage medium. A processor of an electronic device reads the computer-executable instruction from the computer-readable storage medium, and the processor executes the computer-executable instruction, to cause the electronic device to perform the method of hair processing for a virtual object provided in the embodiments of this application.

An embodiment of this application further provides a non-transitory computer-readable storage medium, having a computer-executable instruction stored therein. The computer-executable instruction, when executed by a processor, causes the processor to perform the method of hair processing for a virtual object provided in the embodiments of this application.

In some embodiments, the computer-readable storage medium may be a memory such as a read-only memory (ROM), a random access memory (RAM), an erasable programmable read-only memory (EPROM), an electrically erasable programmable read-only memory (EEPROM), a flash memory, a magnetic surface memory, an optical disc, or a CD-ROM; or may be any device including one of or any combination of the foregoing memories.

In some embodiments, the computer-executable instruction may be written in any form of programming language (including a compiled or interpreted language, or a declarative or procedural language) in a form of a program, software, a software module, a script, or code, and may be deployed in any form, including being deployed as an independent program or being deployed as a module, a component, a subroutine, or another unit suitable for use in a computing environment.

In an example, the computer-executable instruction may, but does not necessarily, correspond to a file in a file system, and may be stored as a part of a file that stores other programs or data, for example, stored in one or more scripts in a hypertext markup language (HTML) document, stored in a single file dedicated to a discussed program, or stored in a plurality of collaborative files (for example, files that store one or more modules, subprograms, or code parts).

In an example, the computer-executable instruction may be deployed to be executed on one electronic device, or executed on a plurality of electronic devices located at one location, or executed on a plurality of electronic devices distributed at a plurality of locations and interconnected by a communication network.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method of processing hair for a virtual object performed by an electronic device, the method comprising:
   obtaining, by the electronic device, an initial position of each of hair particles of virtual hair of a virtual object;
   obtaining, by the electronic device, a physically simulated position of the hair particle by performing physical simulation on a movement of the hair particle in a physical movement based on the initial position of the hair particle;
   fusing, by the electronic device, the initial position and the physically simulated position of the hair particle, to obtain a fused position of the hair particle; and
   rendering, by the electronic device, the virtual hair of the virtual object based on the fused positions of the hair particles, to obtain rendered virtual hair.

2. The method according to claim 1, wherein the obtaining, by the electronic device, an initial position of each of hair particles of virtual hair of a virtual object comprises:
   obtaining, by the electronic device, a hair particle model created for the virtual hair of the virtual object; and
   determining, by the electronic device, for each of the hair particles, a model position of the hair particle using the hair particle model as the initial position of the hair particle.

3. The method according to claim 1, wherein the obtaining, by the electronic device, an initial position of each of hair particles of virtual hair of a virtual object comprises:
   obtaining, by the electronic device, a hair particle model, a hair mesh model, and a hair skeleton of the virtual hair of the virtual object;

determining, by the electronic device, for each of the hair particles, a hair particle position of the hair particle in a model coordinate system of the hair mesh model, determining at least one target skeletal joint related to the hair particle from a plurality of skeletal joints, and determining a target rigging weight of each of the at least one target skeletal joint; and determining, by the electronic device, for each of the hair particles, an animation position of the hair particle in a skinned skeletal animation based on the hair particle position and the target rigging weight of each of the at least one target skeletal joint, and using the animation position of the hair particle as the initial position of the hair particle.

4. The method according to claim 3, wherein the determining, by the electronic device, a hair particle position of the hair particle in a model coordinate system of the hair mesh model comprises:

moving, by the electronic device, the hair particle model, the moved hair particle model being aligned with the hair mesh model;

obtaining, by the electronic device, coordinate transformation information generated during the movement and an initial hair particle position of each of the hair particles in the hair particle model; and determining, by the electronic device, the hair particle position of the hair particle in the model coordinate system of the hair mesh model based on the initial hair particle position and the coordinate transformation information.

5. The method according to claim 3, wherein the determining, by the electronic device, at least one target skeletal joint corresponding to the hair particle from the plurality of skeletal joints, and determining a target rigging weight of each of the at least one target skeletal joint comprises:

determining, by the electronic device, a target mesh vertex closest to the hair particle from the plurality of mesh vertexes; and determining, by the electronic device, at least one skeletal joint related to the target mesh vertex as the at least one target skeletal joint related to the hair particle, and determining a rigging weight of each of the at least one skeletal joint related to the target mesh vertex as the target rigging weight corresponding to each of the at least one target skeletal joint.

6. The method according to claim 3, wherein the determining, by the electronic device, an animation position of the hair particle in the skinned skeletal animation based on the hair particle position and the target rigging weight of each of the at least one target skeletal joint comprises:

separately performing, by the electronic device, the following processing for each of the at least one target skeletal joint: multiplying the hair particle position and the target rigging weight of the target skeletal joint, to obtain an intermediate particle position of the hair particle relative to the target skeletal joint; obtaining a skinning matrix of the target skeletal joint, and multiplying the intermediate particle position and the skinning matrix, to obtain an intermediate animation position; and adding, by the electronic device, intermediate animation positions corresponding to the at least one target skeletal joint, to obtain the animation position of the hair particle in the skinned skeletal animation.

7. The method according to claim 1, wherein the obtaining, by the electronic device, a physically simulated position of the hair particle comprises:

obtaining, by the electronic device, a boundary restriction parameter and a movement parameter of the hair particle, the boundary restriction parameter being a farthest position reachable by the hair particle during the movement, and the movement parameter comprising a movement speed and a movement direction of the hair particle; and adjusting, by the electronic device, the initial position of the hair particle based on the boundary restriction parameter and the movement parameter, to obtain the physically simulated position of the hair particle.

8. The method according to claim 1, wherein the fusing, by the electronic device, the initial position and the physically simulated position of the hair particle, to obtain a fused position of the hair particle comprises:

obtaining, by the electronic device, a first weight of the initial position of the hair particle and a second weight of the physically simulated position of the hair particle; and weighting, by the electronic device, the initial position and the physically simulated position based on the first weight and the second weight, to obtain the fused position of the hair particle.

9. The method according to claim 1, wherein the fusing, by the electronic device, the initial position and the physically simulated position of the hair particle, to obtain a fused position of the hair particle comprises:

determining, by the electronic device, a fusion manner between the initial position and the physically simulated position, the fusion manner comprising at least one of a linear interpolation fusion manner or a spherical interpolation fusion manner; and fusing, by the electronic device, for each of the hair particles, the initial position and the physically simulated position of the hair particle in the fusion manner, to obtain the fused position of the hair particle.

10. An electronic device, comprising:

a processor;

a memory; and a plurality of computer-executable instructions stored in the memory, wherein the computer-executable instructions, when executed by the processor, cause the electronic device to implement a method of processing hair for a virtual object including:

obtaining an initial position of each of hair particles of virtual hair of a virtual object;

obtaining a physically simulated position of the hair particle by performing physical simulation on a movement of the hair particle in a physical movement based on the initial position of the hair particle;

fusing the initial position and the physically simulated position of the hair particle, to obtain a fused position of the hair particle; and rendering the virtual hair of the virtual object based on the fused positions of the hair particles, to obtain rendered virtual hair.

11. The electronic device according to claim 10, wherein the obtaining an initial position of each of hair particles of virtual hair of a virtual object comprises:

obtaining a hair particle model created for the virtual hair of the virtual object; and determining, for each of the hair particles, a model position of the hair particle using the hair particle model as the initial position of the hair particle.

12. The electronic device according to claim 10, wherein the obtaining an initial position of each of hair particles of virtual hair of a virtual object comprises:

obtaining a hair particle model, a hair mesh model, and a hair skeleton of the virtual hair of the virtual object;

determining, for each of the hair particles, a hair particle position of the hair particle in a model coordinate system of the hair mesh model, determining at least one target skeletal joint related to the hair particle from a plurality of skeletal joints, and determining a target rigging weight of each of the at least one target skeletal joint; and determining, for each of the hair particles, an animation position of the hair particle in a skinned skeletal animation based on the hair particle position and the target rigging weight of each of the at least one target skeletal joint, and using the animation position of the hair particle as the initial position of the hair particle.

13. The electronic device according to claim 12, wherein the determining a hair particle position of the hair particle in a model coordinate system of the hair mesh model comprises:

moving the hair particle model, the moved hair particle model being aligned with the hair mesh model;

obtaining coordinate transformation information generated during the movement and an initial hair particle position of each of the hair particles in the hair particle model; and determining the hair particle position of the hair particle in the model coordinate system of the hair mesh model based on the initial hair particle position and the coordinate transformation information.

14. The electronic device according to claim 12, wherein the determining at least one target skeletal joint corresponding to the hair particle from the plurality of skeletal joints, and determining a target rigging weight of each of the at least one target skeletal joint comprises:

determining a target mesh vertex closest to the hair particle from the plurality of mesh vertexes; and determining at least one skeletal joint related to the target mesh vertex as the at least one target skeletal joint related to the hair particle, and determining a rigging weight of each of the at least one skeletal joint related to the target mesh vertex as the target rigging weight corresponding to each of the at least one target skeletal joint.

15. The electronic device according to claim 12, wherein the determining an animation position of the hair particle in the skinned skeletal animation based on the hair particle position and the target rigging weight of each of the at least one target skeletal joint comprises:

separately performing the following processing for each of the at least one target skeletal joint: multiplying the hair particle position and the target rigging weight of the target skeletal joint, to obtain an intermediate particle position of the hair particle relative to the target skeletal joint; obtaining a skinning matrix of the target skeletal joint, and multiplying the intermediate particle position and the skinning matrix, to obtain an intermediate animation position; and adding intermediate animation positions corresponding to the at least one target skeletal joint, to obtain the animation position of the hair particle in the skinned skeletal animation.

16. The electronic device according to claim 10, wherein the obtaining a physically simulated position of the hair particle comprises:

obtaining a boundary restriction parameter and a movement parameter of the hair particle, the boundary restriction parameter being a farthest position reachable by the hair particle during the movement, and the movement parameter comprising a movement speed and a movement direction of the hair particle; and adjusting the initial position of the hair particle based on the boundary restriction parameter and the movement parameter, to obtain the physically simulated position of the hair particle.

17. The electronic device according to claim 10, wherein the fusing the initial position and the physically simulated position of the hair particle, to obtain a fused position of the hair particle comprises:

obtaining a first weight of the initial position of the hair particle and a second weight of the physically simulated position of the hair particle; and weighting the initial position and the physically simulated position based on the first weight and the second weight, to obtain the fused position of the hair particle.

18. The electronic device according to claim 10, wherein the fusing the initial position and the physically simulated position of the hair particle, to obtain a fused position of the hair particle comprises:

determining a fusion manner between the initial position and the physically simulated position, the fusion manner comprising at least one of a linear interpolation fusion manner or a spherical interpolation fusion manner; and fusing, for each of the hair particles, the initial position and the physically simulated position of the hair particle in the fusion manner, to obtain the fused position of the hair particle.

19. A non-transitory computer-readable storage medium, having a plurality of computer-executable instructions stored therein, the computer-executable instructions, when executed by a processor of an electronic device, causing the electronic device to implement a method of processing hair for a virtual object including:

obtaining an initial position of each of hair particles of virtual hair of a virtual object;

obtaining a physically simulated position of the hair particle by performing physical simulation on a movement of the hair particle in a physical movement based on the initial position of the hair particle;

fusing the initial position and the physically simulated position of the hair particle, to obtain a fused position of the hair particle; and rendering the virtual hair of the virtual object based on the fused positions of the hair particles, to obtain rendered virtual hair.

20. The non-transitory computer-readable storage medium according to claim 19, wherein the fusing the initial position and the physically simulated position of the hair particle, to obtain a fused position of the hair particle comprises:

obtaining a first weight of the initial position of the hair particle and a second weight of the physically simulated position of the hair particle; and weighting the initial position and the physically simulated position based on the first weight and the second weight, to obtain the fused position of the hair particle.

* * * * *